(12) United States Patent
Himetani et al.

(10) Patent No.: US 8,567,283 B2
(45) Date of Patent: Oct. 29, 2013

(54) VEHICLE OPERATING PEDAL DEVICE

(75) Inventors: Yoshiro Himetani, Toyota (JP); Mitsunobu Hoketsu, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 574 days.

(21) Appl. No.: 12/735,580

(22) PCT Filed: Apr. 28, 2008

(86) PCT No.: PCT/JP2008/058219
§ 371 (c)(1),
(2), (4) Date: Jul. 29, 2010

(87) PCT Pub. No.: WO2009/096047
PCT Pub. Date: Aug. 6, 2009

(65) Prior Publication Data
US 2010/0307284 A1    Dec. 9, 2010

(30) Foreign Application Priority Data

Jan. 31, 2008   (JP) ................................ 2008-021329
Apr. 1, 2008   (JP) ................................ 2008-095488

(51) Int. Cl.
*G05G 1/30*    (2008.04)
*B60T 7/06*    (2006.01)
*G05G 1/46*    (2008.04)

(52) U.S. Cl.
CPC .... *B60T 7/06* (2013.01); *G05G 1/46* (2013.01)
USPC .................... 74/512; 74/513; 74/514; 74/560

(58) Field of Classification Search
USPC ............... 74/512–514, 560; 180/274; 60/554
See application file for complete search history.

(56) References Cited

U.S. PATENT DOCUMENTS

| | | | | |
|---|---|---|---|---|
| 6,070,488 | A * | 6/2000 | Yabusaki et al. ................. | 74/512 |
| 6,513,407 | B1 * | 2/2003 | Higgins .......................... | 74/560 |
| 7,568,545 | B2 * | 8/2009 | Tanigawa et al. ............. | 180/274 |
| 2005/0217264 | A1 * | 10/2005 | Miyoshi et al. ................. | 60/554 |
| 2007/0199402 | A1 * | 8/2007 | Plagmann et al. .............. | 74/512 |
| 2010/0180717 | A1 * | 7/2010 | Himetani ........................ | 74/560 |
| 2011/0094329 | A1 * | 4/2011 | Himetani ........................ | 74/512 |
| 2011/0094330 | A1 * | 4/2011 | Himetani et al. ................ | 74/512 |

FOREIGN PATENT DOCUMENTS

| | | |
|---|---|---|
| JP | 39-24920 | 8/1939 |
| JP | 50-137732 | 4/1949 |
| JP | 52-54756 | 10/1950 |
| JP | 11-78817 | 3/1999 |
| JP | 2007-62675 | 3/2007 |
| JP | 2007-122610 | 5/2007 |
| JP | 2007-320404 | 12/2007 |

* cited by examiner

*Primary Examiner* — Vinh Luong
(74) *Attorney, Agent, or Firm* — Finnegan, Henderson, Farabow, Garrett & Dunner, LLP

(57) ABSTRACT

A vehicle operating pedal device includes an operating pedal having a hollow structure; a reaction force member; a pivotal connecting portion; and a reinforcement member having a form of a flat plate and disposed between paired side walls. Paired through-holes are formed in the paired side walls which have forms of flat plates and are located on both sides in a vehicle width direction, parallel to each other and substantially perpendicular to the support shaft axis, at positions on a straight line that is substantially parallel to the support shaft axis, in the pivotal connecting portion. A pin insertion hole is formed in the reinforcement member at a position corresponding to the paired through-holes, a connecting pin is inserted through the pin insertion hole, and the reinforcement member is integrally fixed to the paired side walls at a portion on an outer peripheral side of the pin insertion hole.

8 Claims, 16 Drawing Sheets

VEHICLE OPERATING PEDAL DEVICE

CROSS-REFERENCE TO RELATED APPLICATIONS

This application is a national phase application of International Application No. PCT/JP2008/058219, filed Apr. 28, 2008, and claims the priority to Japanese Applications No. 2008-021329, filed Jan. 31, 2008, and 2008-095488, filed Apr. 1, 2008, the contents of both of which are incorporated herein by reference.

TECHNICAL FIELD

The invention relates to a vehicle operating pedal device such as a brake pedal device, and particularly to a connecting structure of a pivotal connecting portion that transmits operating force through a connecting pin.

BACKGROUND ART

A vehicle operating pedal device including (a) an operating pedal that is disposed on a pedal support fixed to a vehicle so that the operating pedal is pivotable around a support shaft axis, and that is depressed by a driver; (b) a reaction force member to which operating force of the operating pedal is transmitted, and to which reaction force corresponding to the operating force is applied; and (c) a pivotal connecting portion disposed between the operating pedal and the reaction force member, or between the operating pedal and an intermediate member that transmits the operating force to the reaction force member, wherein the pivotal connecting portion connects the operating pedal and the reaction force member so that the operating pedal and the reaction force member are relatively pivotable around a connecting pin that is parallel to the support shaft axis, or connects the operating pedal and the intermediate member so that the operating pedal and the intermediate member are relatively pivotable around the connecting pin, and the pivotal connecting portion transmits the operating force through the connecting pin, is widely used as, for example, a brake pedal device for a service brake and a brake pedal device for a parking brake. Patent Document 1 and Patent Document 2 describe devices that are examples of the operating pedal device. In each of the devices, an operating pedal has a hollow structure. In the pivotal connecting portion for the operating pedal, paired connecting holes are formed in paired side walls located on both sides in a vehicle width direction at positions on one straight line that is substantially parallel to a support shaft axis. A connecting pin is inserted through the paired connecting holes. A reaction force member is connected to the pivotal connecting portion through a crevice or the like.

Patent Document 1: Japanese Patent Application Publication No. 2007-122610 (JP-A-2007-122610)
Patent Document 2: Japanese Patent Application Publication No. 11-78817 (JP-A-11-78817)

DISCLOSURE OF THE INVENTION

Problem to be Solved by the Invention

However, in the structure in which the connecting pin is directly inserted through the connecting holes formed in the paired side walls of the operating pedal, efficiency of the operation of inserting the connecting pin through the connecting hole on an opposite side is low. In addition, because reaction force concentrates on edges around the connecting holes, wear, buckling, and the like may occur. Thus, the plate thickness of the operating pedal needs to be large. In the device described in Patent Document 1, a collar is fixed to the edge around one of the holes. Therefore, the efficiency of the operation of inserting the connecting pin is improved, and strength is increased. However, there is still a problem that wear, buckling, and the like may occur in the side wall on the opposite side.

In view of the above, for example, technologies as shown in FIGS. 19A to 19C may be conceived. Each of FIGS. 19A to 19C is a sectional view showing a pivotal connecting portion 212 in a case where a push rod 210, which is a reaction force member, is directly connected to an operating pedal 200. The operating pedal 200 is constituted by paired half bodies 202 and 204 as in the device described in Patent Document 1. Side edges of the half bodies 202 and 204, that is, edges extending in a front-rear direction and a top-bottom direction of a vehicle, are integrally welded to each other. The operating pedal 200 is relatively pivotably connected to the push rod 210 through a connecting pin 206 and a crevice 208. FIG. 19A shows a case where burring holes 214 and 216, which serve as the connecting holes, are formed in the half bodies 202 and 204 that function as paired side walls. Edge portions around the burring holes 214 and 216 inwardly protrude. Because reaction force concentrates on the burring holes 214 and 216, it is not possible to sufficiently solve the problem such as wear and buckling. Further, it is difficult to manage dimensional accuracy. For example, it is difficult to align centers of the paired burring holes 214 and 216. This increases manufacturing cost. FIG. 19B shows a case where a cylindrical collar 220 is disposed to extend through the burring holes 214 and 216. Efficiency of the operation of inserting the connecting pin 206 is improved, and wear is improved. However, because the reaction force concentrates on portions around the burring holes 214 and 216, there is still a possibility that buckling may occur. In addition, it is difficult to manage the dimensional accuracy. For example, when the paired half bodies 202 and 204 are welded and fixed to each other, and the collar 220 is disposed to extend from one of the half bodies 202 and 204 to the other, it is difficult to align the centers of the burring holes 214 and 216. This increases the manufacturing cost. FIG. 19C shows a case where flanged collars 230 and 232 are disposed at simple connecting holes. There is still a possibility that buckling may occur at the edges around the holes. In addition, it is difficult to manage the dimensional accuracy. For example, when the paired half bodies 202 and 204 are welded and fixed to each other, it is difficult to align the centers of the flanged collars 230 and 232, or the centers of the connecting holes. This increases the manufacturing cost.

The invention has been made under such circumstances, and an object of the invention is to suppress wear and buckling of a pivotal connecting portion in which a connecting pin is disposed, while the plate thickness of an operating pedal with a hollow structure is maintained to be small.

Means for Solving the Problem

To achieve the object, the first aspect of the invention is a vehicle operating pedal device including (a) an operating pedal that is disposed on a pedal support fixed to a vehicle so that the operating pedal is pivotable around a support shaft axis, and that is depressed by a driver; (b) a reaction force member to which operating force of the operating pedal is transmitted, and to which reaction force corresponding to the operating force is applied; (c) a pivotal connecting portion disposed between the operating pedal and the reaction force member, or between the operating pedal and an intermediate member that transmits the operating force to the reaction force member, wherein the pivotal connecting portion connects the operating pedal and the reaction force member so that the operating pedal and the reaction force member are relatively pivotable around a connecting pin that is parallel to the support shaft axis, or connects the operating pedal and the intermediate member so that the operating pedal and the intermediate member are relatively pivotable around the connecting pin, and the pivotal connecting portion transmits the operating force through the connecting pin, the vehicle operating pedal device characterized in that (d) the operating pedal has a hollow structure; paired through-holes are formed in paired side walls which form flat plates and are located on both sides in a vehicle width direction, parallel to each other and substantially perpendicular to the support shaft axis, at positions on a straight line that is substantially parallel to the support shaft axis, in the pivotal connecting portion for the operating pedal; and (e) the vehicle operating pedal device includes a reinforcement member which has a form of a flat plate and is disposed between the paired side walls, a pin insertion hole is formed in the reinforcement member at a position corresponding to the paired through-holes, the connecting pin is inserted through the pin insertion hole, and the reinforcement member is integrally fixed to the paired side walls at a portion on an outer peripheral side of the pin insertion hole.

The second aspect of the invention is a vehicle operating pedal device according to the first aspect of the invention, wherein (a) the operating pedal is formed by integrally joining paired half bodies; flat portions of the paired half bodies, which are substantially perpendicular to the support shaft axis, and parallel to each other, are the paired side walls; (b) the reinforcement member integrally includes a body portion in a form of a flat plate, which is located in a manner such that the body portion is sandwiched between inner portions of the paired side walls, and paired fitting protruding portions that are symmetrically provided to protrude from both end surfaces of the body portion, and that are fitted in the paired through-holes; the pin insertion hole is formed to extend through the paired fitting protruding portions; and (c) the reinforcement member is positioned with respect to the operating pedal by fitting the paired fitting protruding portions in the respective paired through-holes.

The third aspect of the invention is a vehicle operating pedal device according to the first or second aspect of the invention, wherein a portion of an outer peripheral edge of the reinforcement member substantially coincides with side end edges of the paired side walls, constitutes a portion of an outer peripheral shape of the operating pedal, and is integrally welded to the side end edges.

The fourth aspect of the invention is a vehicle operating pedal device according to any one of the first to third aspects of the invention, wherein the reinforcement member is integrally fixed to the paired side walls at a portion on a side opposite to a side toward which the reaction force is applied from the connecting pin, in an area around a center line of the pin insertion hole.

The fifth aspect of the invention is a vehicle operating pedal device according to the third or fourth aspect of the invention, wherein mortar-shaped inclined portions are provided at portions on a side opposite to portions to which the reinforcement member is fixed, in areas around a center line of the pin insertion hole of the reinforcement member, in the paired side walls; and the inclined portions obliquely extend from the reinforcement member so that a distance between the inclined portions increases in a direction away from the pin insertion hole.

The sixth aspect of the invention is a vehicle operating pedal device according to any one of the first to fifth aspects of the invention, wherein the reinforcement member is integrally fixed to a boss that is integrally provided in the operating pedal to be concentric with the support shaft axis.

The seventh aspect of the invention is a vehicle operating pedal device according to any one of the first to sixth aspects of the invention, wherein (a) a connecting link, which is the intermediate member, is relatively pivotably connected to the operating pedal through the pivotal connecting portion; and (b) the connecting link is connected to the reaction force member through an intermediate lever that is disposed to be pivotable around a rotation shaft axis that is parallel to the support shaft axis.

The eighth aspect of the invention is a vehicle operating pedal device according to any one of the first to sixth aspects of the invention, wherein the reaction force member is directly connected to the operating pedal through the pivotal connecting portion.

The ninth aspect of the invention is a vehicle operating pedal device including (a) an operating pedal that is disposed on a pedal support fixed to a vehicle so that the operating pedal is pivotable around a support shaft axis, and that is depressed by a driver; (b) a reaction force member to which operating force of the operating pedal is transmitted, and to which reaction force corresponding to the operating force is applied; (c) a pivotal connecting portion disposed between the operating pedal and the reaction force member, or between the operating pedal and an intermediate member that transmits the operating force to the reaction force member, wherein the pivotal connecting portion connects the operating pedal and the reaction force member so that the operating pedal and the reaction force member are relatively pivotable around a connecting pin that is parallel to the support shaft axis, or connects the operating pedal and the intermediate member so that the operating pedal and the intermediate member are relatively pivotable around the connecting pin, and the pivotal connecting portion transmits the operating force through the connecting pin, the vehicle operating pedal device characterized in that (d) the operating pedal has a hollow structure; a flange in a form of a plate, which is substantially perpendicular to the support shaft axis, is provided at an outer peripheral portion of the operating pedal, the outer peripheral portion being connected to the reaction force member or the intermediate member through the pivotal connecting portion; a cutout is formed in the flange; and (e) a reinforcement member, which has a pin insertion hole through which the connecting pin is inserted and a recessed groove which is continuously formed in a circumferential direction and corresponds to the cutout, on an outer peripheral surface of the reinforcement member, in which the flanges are fitted, is inserted in the cutout from an open side of the cutout, and integrally fixed to the flange such that an inner peripheral edge portion of the cutout is fitted in the recessed groove.

The tenth aspect of the invention is a vehicle operating pedal device according to the ninth aspect of the invention, wherein (a) the operating pedal is constituted by paired half bodies each of which has a shape obtained by dividing the operating pedal in a vehicle width direction; the paired half bodies are integrally joined in a manner such that flanges in a form of plates, which are provided at outer peripheral portions of the paired half bodies, and parallel to each other, are overlapped with each other, whereby the operating pedal has a hollow structure; (b) the reinforcement member has a shape of a flat plate with a thickness larger than a total thickness of the flanges of the paired half bodies, which are overlapped with each other; the recessed groove is formed at the outer peripheral surface of the reinforcement member; and (c) the reinforcement member is positioned with respect to the operating pedal by inserting the reinforcement member in the cutout of the flanges, and fitting an inner peripheral edge portion of the cutout in the recessed groove.

The eleventh aspect of the invention is a vehicle operating pedal device according to the ninth or tenth aspect of the invention, wherein each of the cutout and the reinforcement member has a shape symmetrical with respect to a direction in which the reinforcement member is inserted in the cutout.

Effects of the Invention

In the vehicle operating pedal device according to the first aspect of the invention, the reinforcement member which has a form of a flat plate, in which the pin insertion hole is formed, is disposed between the paired side walls, and the reinforcement member is integrally fixed to the paired side walls at the portion on the outer peripheral side of the pin insertion hole. Therefore, the reaction force, which is applied from the connecting pin to the paired side walls through the reinforcement member, is dispersed, and rigidity of the side walls is improved. Thus, buckling due to the reaction force is suppressed while the plate thickness of the side walls is maintained to be small. Further, because the connecting pin is inserted through the pin insertion hole disposed to extend through the reinforcement member, efficiency of the operation is improved. In addition, even when the connecting pin is rotated relative to the pin insertion hole, wear of the pin insertion hole is suppressed.

The second aspect of the invention relates to the case where the operating pedal has the structure in which the paired half bodies are integrally joined. The reinforcement member is disposed in a manner such that the reinforcement member is sandwiched between the flat portions of the paired half bodies, which are substantially perpendicular to the support shaft axis, and parallel to each other. The reinforcement member is positioned by fitting the paired fitting protruding portions that are symmetrically provided, in the respective through-holes. Therefore, as compared to a case where paired burring holes are formed, or a collar or the like is disposed, management of high dimensional accuracy is not required, for example, center alignment is not required. Thus, the operation of assembling the operating pedal including the reinforcement member is facilitated. This reduces manufacturing cost. Particularly, because the paired fitting protruding portions are symmetrically provided, the symmetrical shape can be oriented in any direction. Thus, the assembly operation is further facilitated, and productivity is improved.

According to the third aspect of the invention, a portion of an outer peripheral edge of the reinforcement member substantially coincides with side end edges of the paired side walls, constitutes a portion of an outer peripheral shape of the operating pedal, and is integrally welded to the side end edges. Thus, the reaction force applied to the paired side walls is appropriately dispersed, and rigidity of the side walls is improved. Thus, buckling due to the reaction force is appropriately suppressed.

According to the fifth aspect of the invention, mortar-shaped inclined portions are provided at portions on a side opposite to portions to which the reinforcement member is fixed, in areas around a center line of the pin insertion hole of the reinforcement member, in the paired side walls; and the inclined portions obliquely extend from the reinforcement member so that a distance between the inclined portions increases in a direction away from the pin insertion hole. Thus, the reaction force, which is applied from the reinforcement member to the paired side walls through the portions at which the reinforcement member is fixed, is further efficiently dispersed due to the inclined portions, and the rigidity is improved. Thus, the buckling due to the reaction is suppressed more effectively, while the plate thickness of the side walls is maintained to be small.

According to the sixth aspect of the invention, the reinforcement member is integrally fixed to a boss that is integrally provided in the operating pedal to be concentric with the support shaft axis. Thus, the rigidity of the boss of the operating pedal and the rigidity of the pivotal connecting portion for the operating pedal are integrally improved, while the plate thickness of the side walls is maintained to be small.

According to the seventh aspect of the invention, a connecting link, which is the intermediate member, is relatively pivotably connected to the operating pedal through the pivotal connecting portion; and the connecting link is connected to the reaction force member through an intermediate lever that is disposed to be pivotable around a rotation shaft axis that is parallel to the support shaft axis. Thus it is possible to set a lever ratio to a desired nonlinear lever ratio.

According to the eighth aspect of the invention, the reaction force member is directly connected to the operating pedal through the pivotal connecting portion. Thus, the connecting link is not required.

In the vehicle operating pedal device according to the ninth invention, the flange in the form of a plate, which is substantially perpendicular to the support shaft axis, is provided at the outer peripheral portion of the operating pedal with the hollow structure, the outer peripheral portion being connected to the reaction force member or the intermediate member through the pivotal connecting portion. The cutout is formed in the flange. The reinforcement member, which has the pin insertion hole and the recessed groove formed on the outer peripheral surface, is inserted in the cutout, and integrally fixed to the cutout such that the inner peripheral edge portion of the cutout is fitted in the recessed groove. Therefore, the reaction force, which is transmitted from the connecting pin to the flange through the reinforcement member, is dispersed. Thus, buckling and deformation due to stress concentration are prevented, and rigidity of the flange in the form of a plate is improved. Further, because the connecting pin is inserted through the pin insertion hole formed to extend through the reinforcement member, the efficiency of the operation is improved. In addition, even when the connecting pin is rotated relative to the pin insertion hole, the wear of the pin insertion hole is suppressed.

The recessed groove, in which the flanges are fitted, and which corresponds to the cutout, is formed at the outer peripheral portion of the reinforcement member. Particularly, because the reinforcement member is inserted in the cutout so that the inner peripheral edge portion of the cutout is fitted in the recessed groove, it is possible to fit the reinforcement member to the operating pedal with a single action. Thus, the assembly operation is further facilitated, and the productivity is improved.

The tenth invention relates to the case where the operating pedal has the structure in which the paired half bodies are integrally joined in a manner such that the flanges provided at the outer peripheral portions of the paired half bodies are overlapped with each other. The recessed groove, in which the flanges are fitted, and which corresponds to the cutout, is formed at the outer peripheral portion of the reinforcement member. The reinforcement member is positioned with respect to the operating pedal by fitting the inner peripheral edge portion of the cutout in the recessed groove. Therefore, in the case where the reinforcement member is inserted in the cutout before the paired half bodies are integrally joined, the paired half bodies are positioned by the reinforcement member. Thus, as compared to the case where the paired burring holes are formed, or the collar or the like is disposed, the management of high dimensional accuracy is not required, for example, center alignment is not required. Thus, the operation of assembling the operating pedal including the reinforcement member is facilitated. This reduces manufacturing cost.

When the outer end edges of the flanges of the paired half bodies are fusion joined by arc welding or the like while the flanges are overlapped with each other, the flanges are integrally welded to the outer peripheral portion of the reinforcement member simultaneously with the welding of the flanges to each other, if the outer end edges of the flanges and the outer peripheral portion of the reinforcement member are configured to substantially coincide with each other at the portion at which the flanges are fitted in the recessed groove of the reinforcement member. Therefore, it is possible to continuously perform the welding operations without interruption. Thus, the productivity is further improved. A manufacturing method thereof, means for joining the half bodies, and means for fixing the reinforcement member are appropriately determined. For example, the paired half bodies may be integrally joined before the reinforcement member is inserted in the cutout, or the welding of the half bodies and the fixing of the reinforcement member may be performed in separate processes. The paired half bodies may be joined by resistance welding or the like.

In the eleventh invention, each of the cutout and the reinforcement member has the shape symmetrical with respect to the direction in which the reinforcement member is inserted in the cutout. Therefore, it is possible to insert the reinforcement member in a manner such that the reinforcement member is rotated by 180° around a symmetry center line. Thus, the efficiency of the operation of fitting the reinforcement member to the operating pedal is improved, and the productivity is further increased.

The vehicle operating pedal device according to each of the above-described inventions is appropriately applied to an operating pedal device for a service brake and an operating pedal device for a parking brake to which a comparatively large reaction force is applied. In addition, the vehicle operating pedal device according to each of the above-described inventions can be applied to other vehicle operating pedal devices such as an accelerator pedal and a clutch pedal. The reaction force member may be a member to which reaction force corresponding to output is mechanically applied, such as a push rod of a brake master cylinder. In an electric operating pedal device in which a depression stroke and the like of an operating pedal are electrically detected, and brake force and the like are controlled, the reaction force member may be a member to which predetermined reaction force is applied in accordance with the depression stroke by a simulation device that has urging means such as a spring.

The reaction force member may be directly connected to the operating pedal through the pivotal connecting portion, or may be connected to the operating pedal through the intermediate lever, the connecting link, and the like. The reaction force member may be connected to the operating pedal through a plurality of intermediate levers.

The operating pedal with the hollow structure may have various configurations. For example, the operating pedal may be formed by bending one steel plate or the like into a cylindrical shape, or may be formed using a square pipe or the like. The operating pedal may be formed by integrally joining both end edges of paired half bodies made of a steel plate or the like, by welding or the like. The operating pedal need not necessarily be pouched, that is, the entire periphery of the operating pedal need not necessarily be closed. A portion of the periphery of the operating pedal may be open.

The through-holes formed in the paired side walls have a size equal to or larger than the size of the pin insertion hole of the reinforcement member. The connecting pin, which is inserted through the pin insertion hole, extends through the through-holes, and protrudes toward both sides. When the fitting protruding portions are provided in the reinforcement member as in the second invention, the through-holes have a size sufficiently larger than the size of the pin insertion hole, and equal to or larger than the size of the fitting protruding portions. Each of the pin insertion hole and the connecting pin has a perfect circular shape. It is desirable that each of the through-hole and the fitting protruding portion should have a perfect circular shape. However, each of the through-hole and the fitting protruding portion need not necessarily have a perfect circular shape. When the reinforcement member itself has a perfect circular disc shape, the reinforcement member is not anisotropic, and thus, the reinforcement member is easily fitted. However, the shape of the reinforcement member may be appropriately set in accordance with the shape of the operating pedal. When implementing the first invention, a reinforcement member that does not include any fitting protruding portion may be employed.

The reinforcement member may be integrally fixed to the side walls at only a portion around the center line of the pin insertion hole by welding or the like. The reinforcement member may be fixed to the side walls at a plurality of portions located at substantially equal intervals (i.e., at equal angular intervals) in an area around the center line of the pin insertion hole, by resistance welding or the like. It is appropriate to employ welding such as arc welding and resistance welding as means for fixing the reinforcement member. However, various fixing means may be employed. For example, adhesion means, such as brazing, may be employed.

In the third invention, it is desirable that the side end edges of the side walls should be joined to end surfaces of the reinforcement member by fillet welding in a manner such that a portion of the outer peripheral edge of the reinforcement member outwardly protrudes from the side end edges of the side walls. However, to the contrary, a portion of the outer peripheral edge of the reinforcement member may be joined to the side walls by fillet welding in a manner such that the side end edges of the side walls outwardly protrude from the outer peripheral edge of the reinforcement member. The outer peripheral edge of the reinforcement member may coincide with the side end edges of the side walls, and the outer peripheral edge of the reinforcement member may be welded to the side end edges of the side walls at border portions therebetween.

In the fifth invention, the mortar-shaped inclined portions are provided at the portions on the side opposite to the portions to which the reinforcement member is fixed, in the areas around the center line of the pin insertion hole. However, when implementing the other inventions, the inclined portions need not necessarily be provided. The inclined portions may have various configurations. For example, the inclined portions may be formed in a partially taper shape, or a spherical shape, or the inclined portions may be formed by joining a plurality of flat surfaces.

In the sixth invention, the reinforcement member extends from the pivotal connecting portion toward the support shaft axis, and is integrally fixed to the boss. However, in the other inventions, the reinforcement member need not necessarily be fixed to the boss.

The connecting pin of the pivotal connecting portion is disposed to be rotatable relative to, for example, both of the reinforcement member and the reaction force member (or the intermediate member). However, it is possible to fix the connecting pin to one of the reinforcement member and the reaction force member (or the intermediate member) by press fitting or the like so that the connecting pin is unable to rotate relative to the one of the reinforcement member and the reaction force member (or the intermediate member).

The reinforcement member is configured using, for example, mild steel. The reinforcement member is machined to have a predetermined shape by a cutting operation, a cold forging operation, and the like. The reinforcement member is integrally fixed to the flange of the operating pedal by welding such as arc welding. However, it is possible to fix the reinforcement member to the operating pedal using other various fixing means, for example, adhesion means such as brazing. The material and a machining method are appropriately determined.

When the flanges are fitted in the recessed groove formed on the outer peripheral surface of the reinforcement member, the flanges can be integrally fusion joined to the outer peripheral portion of the reinforcement member simultaneously with fusion joining of the flanges by arc welding or the like, at a portion at which the outer peripheral edges of the flanges substantially coincide with the outer peripheral portion of the reinforcement member. However, the flanges can be welded to the reinforcement member by fillet welding or the like. In this case, the outer end edges of the flanges need not necessarily substantially coincide with the outer peripheral portion of the reinforcement member, and the reinforcement member can be welded and fixed to the operating pedal at an entire fitting portion at which the flanges are fitted to the recessed groove, for example, a portion on a side opposite to the open side of the cutout.

It is desirable that the position and orientation of the cutout formed in the flanges should be set so that the reinforcement member is pressed to a terminal portion on a side opposite to the open side of the cutout due to the reaction force applied from the connecting pin to the reinforcement member. However, the cutout may have various configurations. For example, when the reinforcement member can be strongly fixed to the operating pedal, the position and orientation of the cutout may be set so that a load is applied in a direction in which the reinforcement member is moved toward the open side of the cutout, due to the reaction force.

It is desirable that the size of the reinforcement member and the size of the cutout should be set so that the reinforcement member is positioned by inserting the reinforcement member in the cutout. However, the size of the reinforcement member and the size of the cutout need not necessarily be set so that the reinforcement member cannot be moved with respect to the cutout. The size of the reinforcement member and the size of the cutout may be set so that the reinforcement member can be moved with respect to the cutout by a predetermined amount, and therefore, the position of the pin insertion hole, that is, the position of the reinforcement member with respect to the operating pedal can be adjusted.

The cutout includes a terminal portion with a semi-arc shape, and paired straight portions that are continuous with both ends of the terminal portion, and substantially parallel to each other, or inclined in such directions that a distance between the straight portions increases. The cutout is formed in a U-shape or a V-shape as a whole. The reinforcement member has the shape of a disc with a radius larger than that of the terminal end portion. The recessed groove formed on the outer peripheral surface of the disc shape includes a curve portion with a semi-arc shape, which has the substantially same radius as that of the terminal end portion, and is concentric with the disc shape; and paired straight portions that are continuous with both ends of the curve portion, and substantially parallel to each other or inclined in such directions that a distance between the paired straight portions increases. The recessed groove is formed in a U-shape or a Vshape as a whole.

It is desirable that mortar-shaped inclined portions should be provided at areas around the cutout to which the reinforcement member is fixed, in the paired half bodies constituting the operating pedal with the hollow structure, and the inclined portions should obliquely extend so that a distance between the inclined portions increases in a direction away from the cutout. That is, when the reinforcement member is pressed toward the terminal portion of the cutout due to the reaction force applied from the connecting pin to the reinforcement member, the reaction force applied from the reinforcement member to the paired half bodies is more efficiently dispersed due to the mortar-shaped inclined portions, and the rigidity is improved. Thus, the buckling due to the reaction force is more effectively suppressed while the plate thickness of the half bodies is maintained to be small. The inclined portions may have various configurations. For example, the inclined portions may be formed in a partially taper shape or a spherical shape, or the inclined portions may be formed by joining a plurality of flat surfaces.

For example, the reaction force member is directly connected to the operating pedal through the pivotal connecting portion. However, the configuration may be such that (a) a connecting link, which is the intermediate member, is relatively pivotably connected to the operating pedal through the pivotal connecting portion, and (b) the connecting link is connected to the reaction force member through an intermediate lever disposed to be pivotable around a rotation shaft axis that is parallel to the support shaft axis.

Figure 1:
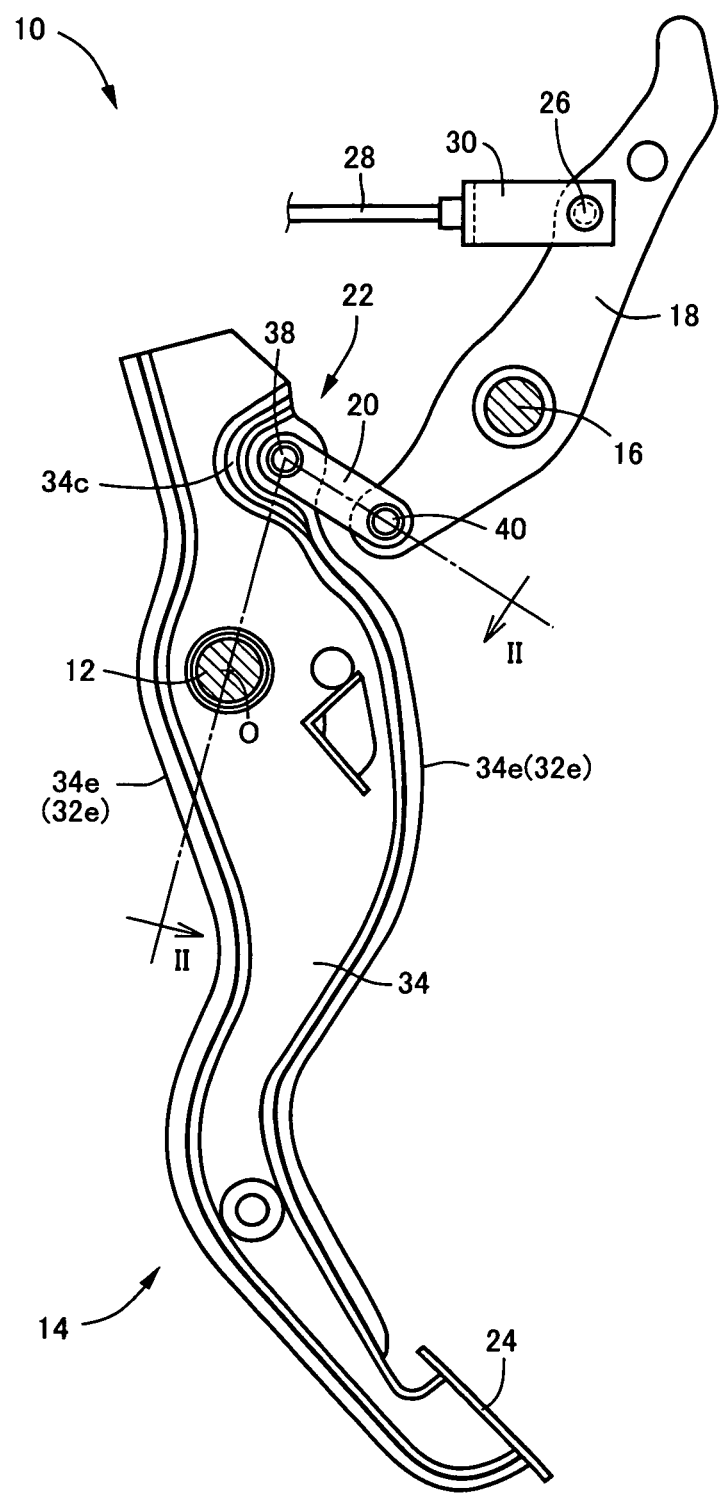
FIG. 1 is a front view showing a brake pedal device for a service brake of a vehicle, to which the invention is applied.

EXPLANATION OF REFERENCE SIGNS 10, 80: brake pedal devices
12: first support shaft
14: operating pedal
18: intermediate lever
20: connecting link
22: pivotal connecting portion
24: pedal sheet
28: push rod
32, 34: half bodies
32*a*, 34*a*: parallel flat portions
32*b*, 34*b*: through-holes
32*c*, 34*c*: mortar-shaped inclined portions
38: first connecting pin
44, 60, 70: reinforcement members
46: body portion
48, 50: fitting protruding portions
52: pin insertion hole
84: connecting pin
110, 160: brake pedal devices (vehicle operating pedals devices)
112: support shaft
114: operating pedal
122: pivotal connecting portion
126: the connecting pin
128: push rod (reaction member) 132, 134: half bodies
132*f*, 134*f*: outer end edges of the flanges
144: reinforcement member
146: recessed groove 148: pin insertion hole
150: cutout
166: connecting link (intermediate member)
168: first connecting pin (connecting pin)
O: shaft axis
W: welding portion

DESCRIPTION OF EMBODIMENTS

The embodiments of the invention will be described in detail by reference to the drawings Embodiment 1

FIG. 1 is a front view of a brake pedal device 10 for a service brake according to an embodiment of the invention. In FIG. 1, an operating pedal 14 is disposed to be pivotable around a shaft axis O of a first support shaft 12 that is substantially horizontal to a pedal support (not shown) that is integrally fixed to a vehicle. An intermediate lever 18 is disposed to be pivotable around a shaft axis of a second support shaft 16 that is substantially parallel to the shaft axis O. Connecting links 20 are disposed to extend from the operating pedal 14 to the intermediate lever 18. The shaft axis O of the first support shaft 12 corresponds to a support shaft axis. The connecting links 20 correspond to an intermediate member to which operating force of the operating pedal 14 is transmitted through a pivotal connecting portion 22.

When a driver depresses a pedal sheet 24 provided at a lower end of the operating pedal 14, the operating pedal 14 is pivoted around the first support shaft 12 in a clockwise direction in FIG. 1. Thus, the intermediate lever 18 is mechanically pivoted around the second support shaft 16 in a counterclockwise direction through the connecting links 20 connected to an upper end portion of the operating pedal 14. A push rod 28 of a brake master cylinder is connected to an upper end portion of the intermediate lever 18 through a crevice 30 so that the push rod 28 is relatively pivotable around an axis of a connecting pin 26 that is substantially parallel to the second support shaft 16. When the intermediate lever 18 is pivoted, the push rod 28 is mechanically pressed toward a left side in the figure. Thus, a brake hydraulic pressure is generated in accordance with depressing force of the operating pedal 14, and reaction force thereof is applied to the push rod 28. The push rod 28 is urged to protrude from the brake master cylinder. When the pedal sheet 24, which has been depressed, is released, the intermediate lever 18 is returned, that is, pivoted in the clockwise direction around the second support shaft 16 due to the urging force, and the operating pedal 14 is returned, that is, pivoted in the counterclockwise direction around the shaft axis O of the first support shaft 16, and thus, the operating pedal 14 is maintained at an original position shown in FIG. 1. The push rod 28 corresponds to a reaction force member.

Figure 2:
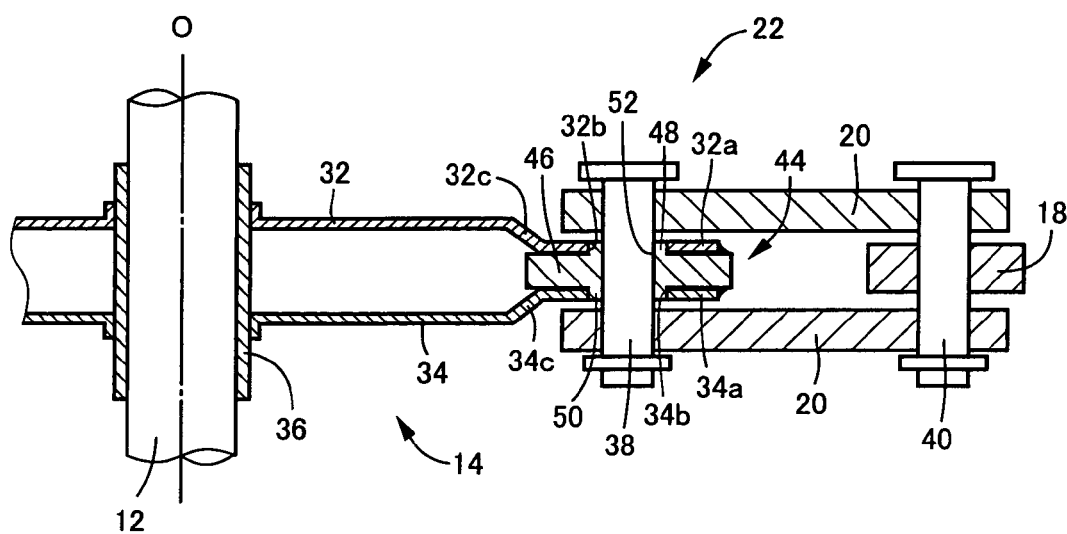
FIG. 2 is an enlarged view of a section taken along a line II-II in FIG. 1.
Figure 3A:
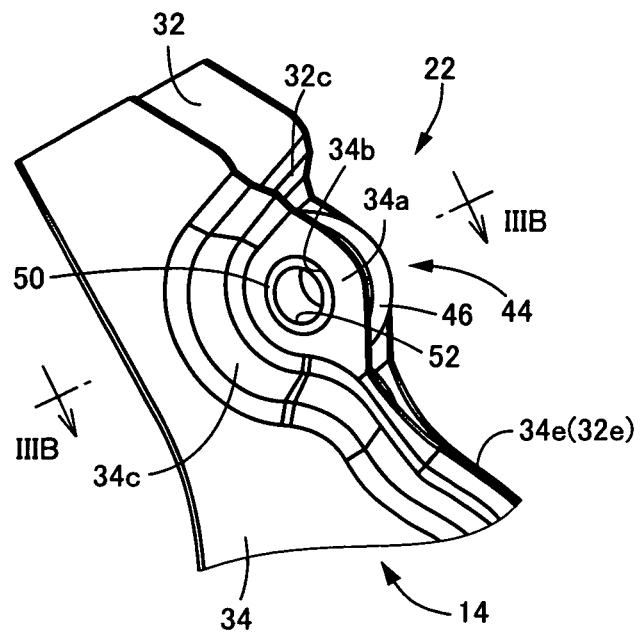
FIGS. 3A and 3B are diagrams each showing a pivotal connecting portion at a side of an operating pedal in the brake pedal device in FIG. 1, FIG. 3A being a perspective view, and FIG. 3B being an enlarged view of a section taken along a line IIIB-IIIB in FIG. 3A.
Figure 3B:
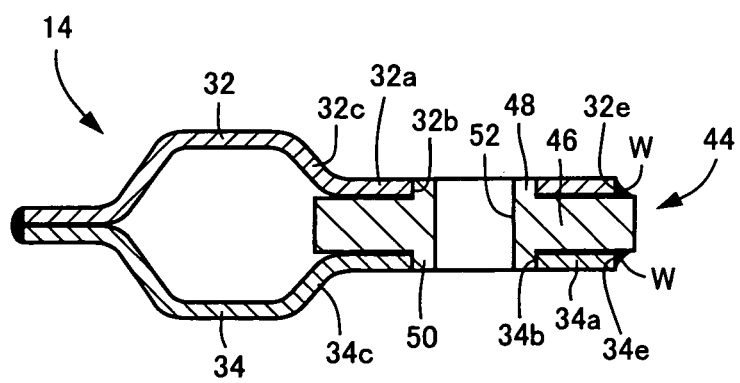

FIG. 2 is a sectional view showing an enlarged section taken along a line II-II in FIG. 1. FIG. 3A is a perspective view showing the enlarged pivotal connecting portion 22 at a side of the operating pedal 14. FIG. 3B is an enlarged view of a section taken along a line IIIB-IIIB. As evident from the figures, the operating pedal 14 includes paired half bodies 32 and 34. Each of the half bodies 32 and 34 is a component formed by pressing a relatively thin steel plate so that each half body has a shape obtained by dividing the operating pedal 14 into substantially half along a plane substantially perpendicular to the shaft axis O of the first support shaft 12, that is, a plane that is substantially parallel to a front-rear direction of the vehicle, and that is substantially vertical. The operating pedal 14 is formed by integrally welding and joining a plurality of portions in side end edges 32e and 34e of the half bodies 32 and 34, that is, edges of the half bodies 32 and 34, which extend in the front-rear direction and a top-bottom direction of the vehicle. The operating pedal 14 has a space with a thickness that is approximately 6 to 15 times the thickness of each of the half bodies 32 and 34 in a thickness direction. That is, the operating pedal 14 has a hollow structure. A through-hole is formed at a portion of the operating pedal 14, which is supported by the first support shaft 12. A cylindrical boss 36, which extends through the half bodies 32 and 34, is integrally fixed to the operating pedal 14 by welding or the like. The paired connecting links 20 are disposed on both sides of the operating pedal 14 and the intermediate lever 18. The connecting links 20 are relatively pivotably connected to the operating pedal 14 through a first connecting pin 38 that is substantially parallel to the shaft axis O of the first support shaft 12. The connecting links 20 are relatively pivotably connected to the intermediate lever 18 through a second connecting pin 40 that is substantially parallel to the first connecting pin 38. The connecting pins 38 and 40 extend through the operating pedal 14 and the intermediate lever 18, respectively. The paired connecting links 20 are connected to end portions of the connecting pin 38, which protrude toward both sides of the operating pedal 14, and connected to end portions of the connecting pin 40, which protrude toward both sides of the intermediate lever 18. The connecting pins 38 and 40 are prevented from falling off the operating pedal 14 and the intermediate lever 18, using snap rings or the likes. The first connecting pin 38 at the side of the operating pedal 14 corresponds to a connecting pin of the pivotal connecting portion 22. The first connecting pin 38 is rotatable relative to both of the operating pedal 14 and the connecting link 20. The first connecting pin 38 is rotated relative to one of the operating pedal 14 and the connecting link 20, which has lower friction than the other.

In the paired half bodies 32 and 34 constituting the operating pedal 14, parallel flat portions 32a and 34a are provided at portions connected to the connecting links 20 through the pivotal connecting portion 22. The parallel flat portions 32a and 34a are disposed at a predetermined interval. The parallel flat portions 32a and 34a are substantially perpendicular to the shaft axis O, and parallel to each other. Paired through-holes 32b and 34b are formed in the parallel flat portions 32a and 34a, respectively, at positions on one straight line that is substantially parallel to the shaft axis O. The parallel flat portions 32a and 34a correspond to paired side walls located on both sides in a vehicle width direction. A reinforcement member 44 is held between the parallel flat portions 32a and 34a. That is, the reinforcement member 44 is disposed between the parallel flat portions 32a and 34a. The reinforcement member 44 is made of a steel plate with a thickness larger than the thickness of each of the half bodies 32 and 34, for example, a thickness that is approximately 3 to 4 times the thickness of each of the half bodies 32 and 34.

The reinforcement member 44 integrally includes a body portion 46 in the form of a flat plate, and paired fitting protruding portions 48 and 50. The body portion 46 is in substantially close contact with inner surfaces of the paired parallel flat portions 32a and 34a, and is sandwiched between the paired parallel flat portions 32a and 34a. The paired fitting protruding portions 48 and 50 are symmetrically provided to protrude substantially perpendicularly from both end surfaces of the body portion 46, and are fitted in the through-holes 32b and 34b, respectively. A pin insertion hole 52 is formed to extend through the paired fitting protruding portions 48 and 50 in a direction substantially parallel to the shaft axis O. The first connecting pin 38 is inserted through the pin insertion hole 52 and connected to the paired connecting links 20. The body portion 46 of the reinforcement member 44 has a substantially perfect circular disc shape. The fitting protruding portions 48 and 55 are provided at a center portion of the body portion 46. The pin insertion hole 52 is formed on a center line of the body portion 46. The first connecting pin 38 is fitted in the pin insertion hole 52. The pin insertion hole 52 is a substantially perfect circular hole, and the first connecting pin 38 has a perfect circular cylindrical shape. The diameter of the pin insertion hole 52 is substantially equal to the diameter of the first connecting pin 38. The position of the reinforcement member 44 with respect to the operating pedal 14 is determined, that is, the reinforcement member 44 is positioned by fitting the fitting protruding portions 48 and 50 in the through-holes 32b and 34b.

Figure 4A:
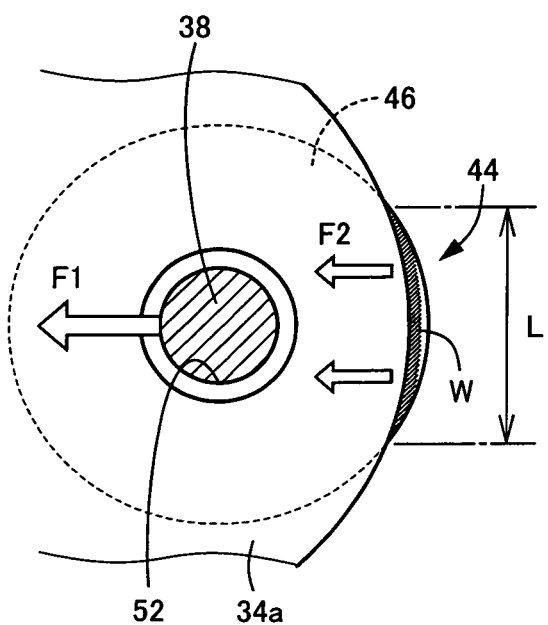
FIGS. 4A and 4B are diagram explaining reaction force applied to the operating pedal, FIG. 4A showing an embodiment in FIG. 1 in which a reinforcement member is provided, and FIG. 4B showing a conventional case in which the reaction force is directly applied from a connecting pin to the operating pedal.
Figure 5:
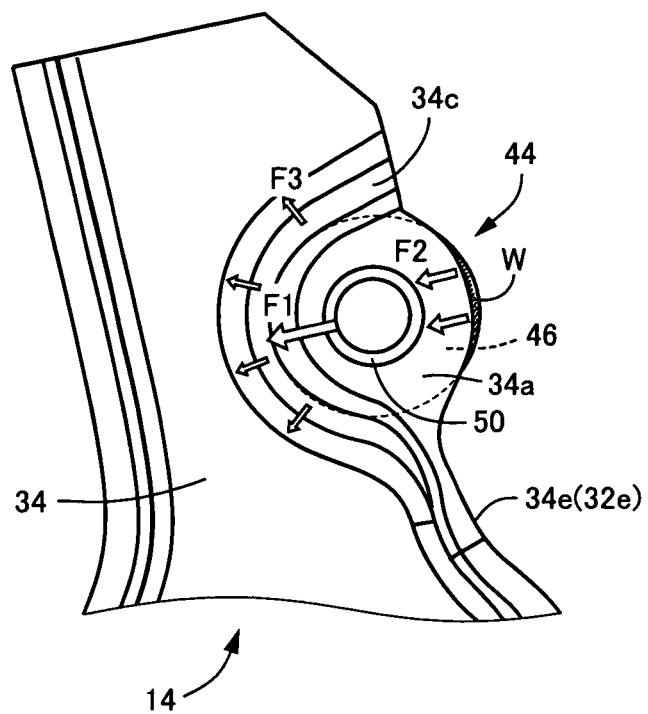
FIG. 5 is a diagram explaining that the reaction force applied from the reinforcement member to the operating pedal in FIG. 4A is further dispersed due to a mortar-shaped inclined portion provided in the operating pedal.

The pivotal connecting portion 22 at the side of the operating pedal 14 is provided at an end edge portion of the operating pedal 14, which is close to a lower end portion of the intermediate lever 18, that is, a portion of the intermediate lever 18 to which the operating pedal 14 is connected through the connecting links 20. A portion of an outer peripheral edge of the body portion 46 of the reinforcement member 44 substantially coincides with the side end edges 32e and 34e of the operating pedal 14, and constitutes a portion of an outer peripheral shape (i.e., a closed section) of the operating pedal 14. In the embodiment, the portion of the outer peripheral edge of the body portion 46 of the reinforcement member 44 slightly protrudes outwardly from the side end edges 32e and 34e of the parallel flat portions 32a and 34a of the operating pedal 14 (refer to FIG. 3B). The side end edges 32e and 34e and the respective end surfaces of the body portion 46 are welded to each other at corner portions between the side end edges 32e and 34e and the respective end surfaces by fillet welding in a predetermined length range L (refer to FIG. 4A) that is larger than a diameter "d" of the first connecting pin 38. Thus, the reinforcement member 44 is integrally fixed to the operating pedal 14. When the side end edges 32e and 34e of the paired half bodies 32 and 34 are integrally welded to each other by arc welding such as TIG welding, the reinforcement member 44 can be also welded to the side end edges 32e and 34e in a series of welding processes without interruption, using the same welding method. In the figures, "W" signifies a welding portion at which the side end edges 32e and 34e and the body portion 46 are welded to each other. As shown in FIG. 4A and FIG. 5, the side end edges 32e and 34e and the body portion 46 are welded to each other at the portion on a side opposite to a side toward which reaction force F1 is applied from the first connecting pin 38, in an area around the center line of the body portion 46, that is, a center line of the pin insertion hole 52.

Figure 4B:
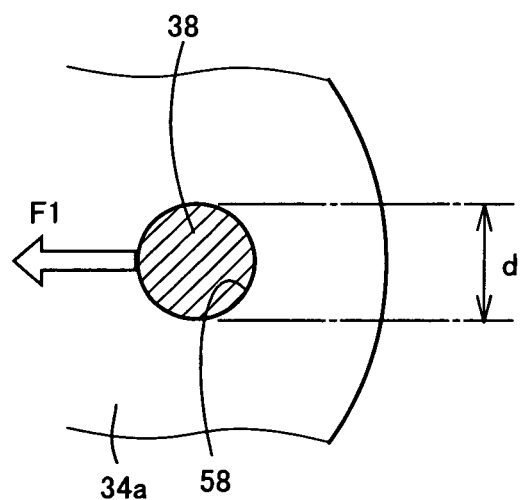

As described above, the reinforcement member 44 is disposed at the pivotal connecting portion 22, and the reinforcement member 44 is integrally welded to the operating pedal 14 in the predetermined length range L larger than the diameter "d" of the first connecting pin 38. Therefore, when the reaction force F1 transmitted from the first connecting pin 38 to the reinforcement member 44 is transmitted to the operating pedal 14 through the welding portion W, the reaction force F1 is dispersed as shown by arrows F2 in FIG. 4A, surface pressure applied to the parallel flat portions 32a and 34a is decreased, and rigidity of the parallel flat portions 32a and 34a is increased. Therefore, buckling due to the reaction force is suppressed while the plate thickness of the parallel flat portions 32a and 34a is maintained to be small. FIG. 4B shows a conventional example in which the first connecting pin 38 is directly inserted through connecting holes 58 formed in the paired parallel flat portions 32a and 34a, and the reaction force F1 is directly applied to the parallel flat portions 32a and 34a. If the length range L of the welding portion W in the embodiment shown in FIG. 4A is, for example, twice the diameter "d" of the first connecting pin 38, and the thickness of the parallel flat portions 32a and 34a in the embodiment is the same as the thickness of the parallel flat portions 32a and 34a in the conventional example, the surface pressure in the embodiment is half of the surface pressure in the conventional example.

In the paired half bodies 32 and 34 shown in FIG. 3B, in areas around the center line of the pin insertion hole 52 of the reinforcement member 44, mortar-shaped inclined portions 32c and 34c are provided substantially symmetrically at portions on a side opposite to portions to which the reinforcement member 44 is welded, in other words, the inclined portions 32c and 34c are provided at the portions on the side toward which the reaction force F1 is applied from the first connecting pin 38 in FIG. 4, that is, the portions located on a substantially left side of the parallel flat portions 32a and 34a where the reinforcement member 44 is disposed in FIG. 3B. The inclined portions 32c and 34c obliquely extend from the reinforcement member 44 so that a distance between the inclined portions 32c and 34c increases, that is, a distance between the paired half bodies 32 and 34 increases in a direction away from the pin insertion hole 52. As evident from FIG. 3B, the inclined portions 32c and 34c are continuous with the parallel flat portions 32a and 34a, and form a portion of a taper shape. Further, as evident from FIG. 5, each of the inclined portions 32c and 34c has a smooth curve that protrudes toward a front side of the vehicle in a plane that is substantially parallel to the front-rear direction of the vehicle, and that is substantially vertical. Therefore, the inclined portions 32c and 34c are formed in the mortar shape as a whole. Thus, the reaction force F2, which is transmitted to the parallel flat portions 32a and 34a from the reinforcement member 44 through the welding portion W is further efficiently dispersed as shown by arrows F3 in FIG. 5 due to the inclination portions 32c and 34c, and the surface pressure applied to the paired half bodies 32 and 34 is further decreased.

Thus, in the brake pedal device 10 in the embodiment, the reinforcement member 44, which has the pin insertion hole 52, is disposed between the parallel flat portions 32a and 34a of the paired half bodies 32 and 34. The reinforcement member 44 is integrally welded to the half bodies 32 and 34 at the portion on an outer peripheral side of the pin insertion hole 52, in the length range L larger than the diameter "d" of the first connecting pin 38. Therefore, the reaction force F2 applied from the first connecting pin 38 to the paired parallel flat portions 32a and 34a through the reinforcement member 44 is dispersed, and the rigidity is improved. Thus, the buckling due to the reaction force F2 is suppressed while the plate thickness of the half bodies 32 and 34 is maintained to be small. More specifically, the portion of the outer peripheral edge of the body portion 46 of the reinforcement member 44 substantially coincides with the side end edges 32e and 34e of the parallel flat portions 32a and 34a, constitutes the portion of the outer peripheral shape of the operating pedal 14, and is integrally welded to the side end edges 32e and 34e. Therefore, the reaction force F2 applied to the paired parallel flat portions 32a and 34a is appropriately dispersed, and the rigidity of the parallel flat portions 32a and 34a is improved. Thus, the buckling due to the reaction force F2 is appropriately suppressed.

Because the first connecting pin 38 is inserted through the pin insertion hole 52 formed to extend through the reinforcement member 44, efficiency of the operation is improved. In addition, because the reaction force F1 is received by the entire inner peripheral surface defining the pin insertion hole 52, wear is suppressed, as compared to the case where the reaction force F1 is directly received by the connecting holes 58 formed in the parallel flat portions 32a and 34a in the form of plates as shown in FIG. 4B.

Figure 19A:
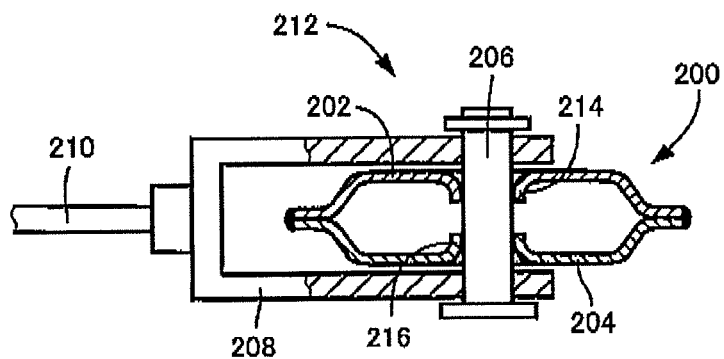
FIG. 19 is a diagram that explains several configurations of a pivotal connecting portion when a reaction force member is directly connected to an operating pedal, and that is a sectional view corresponding to FIG. 9 and FIG. 11.
Figure 19B:
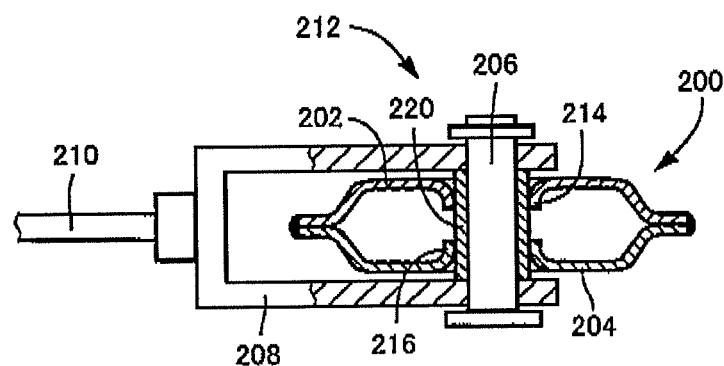
Figure 19C:
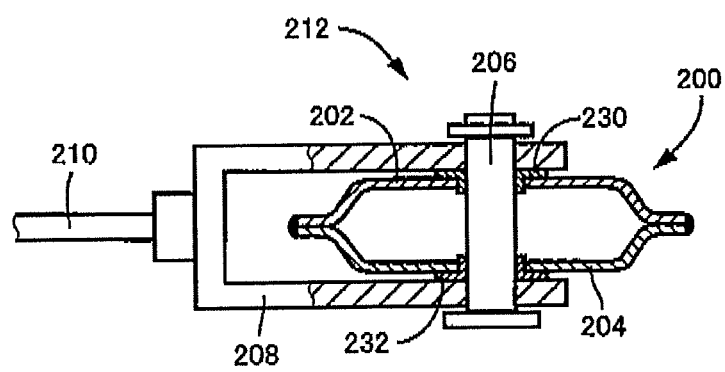

The embodiment is the case where the operating pedal 14 has the structure in which the paired half bodies 32 and 34 are integrally joined. The reinforcement member 44 is sandwiched between the parallel flat portions 32a and 34a of the paired half bodies 32 and 34, which are substantially perpendicular to the shaft axis O of the first support shaft 12, and parallel to each other. The reinforcement member 44 is positioned by fitting the paired fitting protruding portions 48 and 50 that are symmetrically provided, in the through-holes 32b and 34b, respectively. Therefore, as compared to the cases shown in FIGS. 19A to 19C, management of high dimensional accuracy is not required, for example, alignment of the centers of the paired through-holes is not required. Accordingly, the operation of assembling the operating pedal 14 is facilitated. This reduces manufacturing cost.

The body portion 46 of the reinforcement member 44 has a substantially perfect circular disc shape. The paired fitting protruding portions 48 and 50 are symmetrically provided to protrude at the center portion of the body portion 46. Therefore, the symmetrical shape may be oriented in any direction. In addition, the reinforcement member 44 can be fitted to the operating pedal 14 without the need of taking into account a phase around the center line of the body portion 46. Therefore, the assembly operation is facilitated, and productivity is improved.

In the paired half bodies 32 and 34, in the areas around the center line of the pin insertion hole 52 of the reinforcement member 44, the mortar-shaped (fan-shaped) inclined portions 32c and 34c are provided at the portions on the side opposite to the portions to which the reinforcement member 44 is welded, in other words, the inclined portions 32c and 34c are provided at the portions on the side toward which the reaction force F1 is applied from the first connecting pin 38. The inclined portions 32c and 34c obliquely extend from the reinforcement member 44 so that the distance between the inclined portions 32c and 34c increases in the direction away from the pin insertion hole 52. Therefore, the reaction force F2, which is applied from the reinforcement member 44 to the paired parallel flat portions 32a and 34a through the welding portion W, is further efficiently dispersed due to the inclined portions 32c and 34c, and the rigidity is improved. Thus, the buckling due to the reaction force is suppressed more effectively while the plate thickness of the paired half bodies 32 and 34 is maintained to be small.

Embodiment 2

There will next be described another embodiment of this invention. In the following description, the same reference signs as used in the each embodiment will be used to identify the corresponding elements.

Figure 6:
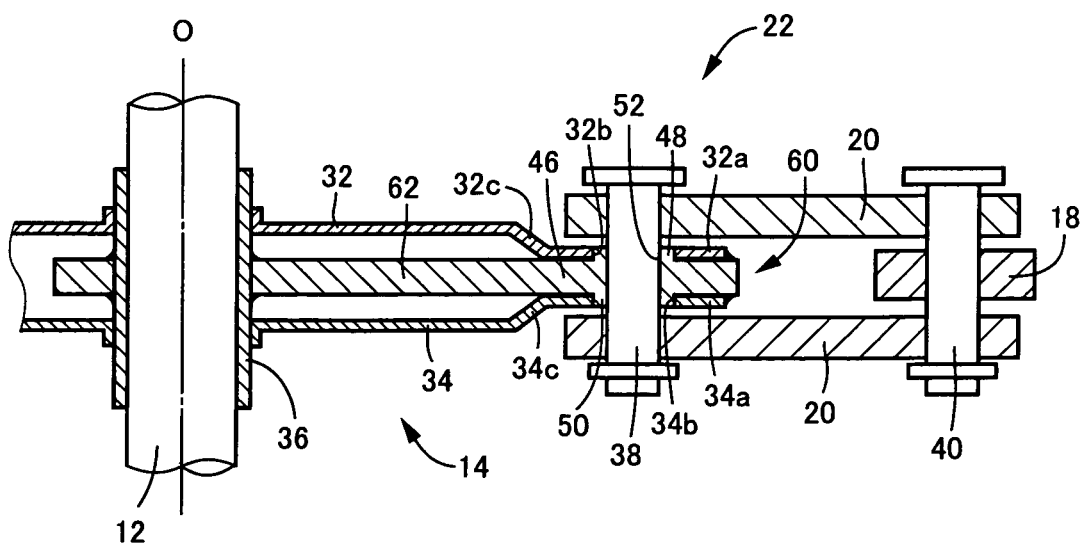
FIG. 6 is a diagram that shows an embodiment in which the reinforcement member is connected to a boss, and that is a sectional view corresponding to FIG. 2.

An embodiment shown in FIG. 6 is a case where a reinforcement member 60 is used instead of the reinforcement member 44. The reinforcement member 60 is integrally provided with an arm portion 62 that is continuous with the body portion 46 and reaches a boss 36. The reinforcement member 60 is integrally welded to the boss 36 through the arm portion 62. The rigidity of the boss 36 of the operating pedal 14 and the rigidity of the pivotal connecting portion 22 for the operating pedal 14 are integrally improved, while the plate thickness of the paired half bodies 32 and 34 is maintained to be small.

Figure 7:
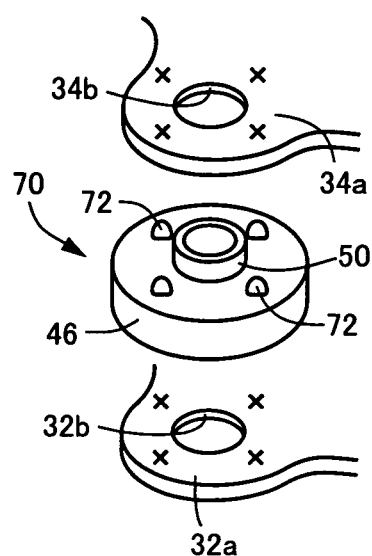
FIG. 7 is a diagram that explains an embodiment in which the reinforcement member is welded to the operating pedal by projection welding, and that is a perspective view before the reinforcement member is welded to the operating pedal.

An embodiment shown in FIG. 7 is a case where a reinforcement member 70 is used. As compared to the reinforcement member 44, a plurality of projections 72 are provided on both end surfaces of the body portion 46 with the disc shape (eight projections 72 are provided on the both end surfaces in the embodiment) at portions on an outer peripheral side of the protruding portions 48 and 50. The projections 72 are disposed around the center line of the pin insertion hole 52 at substantially equal intervals. The reinforcement member 70 is welded to the parallel flat portions 32a and 34a of the paired half bodies 32 and 34 through the projections 72 by projection welding. In the embodiment, it is possible to obtain the substantially same advantageous effects as those obtained in the first embodiment. Cross marks shown in the parallel flat portions 32a and 34a indicate portions at which the reinforcement member 70 is welded to the parallel flat portions 32a and 34a by projection welding.

Figure 8:
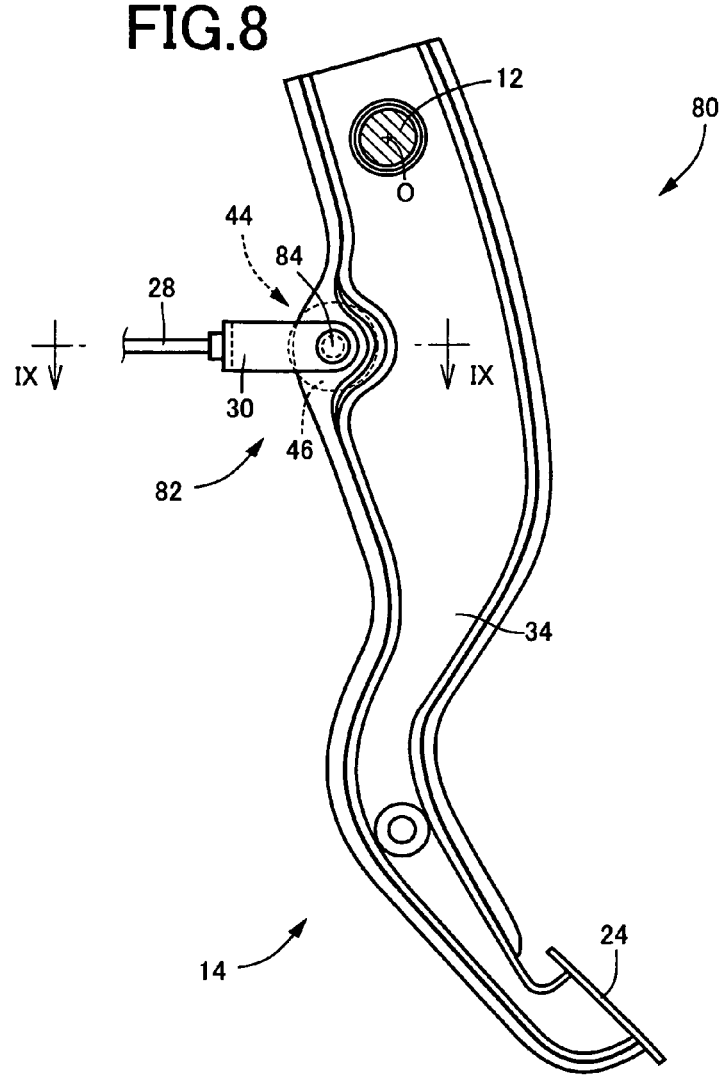
FIG. 8 is a diagram that shows a yet another embodiment of the invention, and that is a front view corresponding to FIG. 1.
Figure 9:
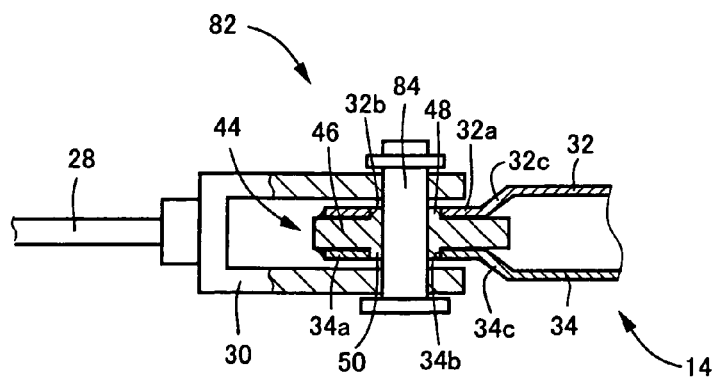
FIG. 9 is an enlarged view of a section taken along a line IX-IX in FIG. 8.

In a brake pedal device 80 in FIG. 8, the push rod 28 is directly connected to the operating pedal 14 through a connecting pin 84, and the reinforcement member 44 is disposed at a pivotal connecting portion 82. As evident from FIG. 9 that is an enlarged view of a section taken along a line IX-IX in FIG. 8, the pivotal connecting portion 82 has the substantially same configuration as the configuration of the pivotal connecting portion 22. In the brake pedal device 80, it is possible to obtain the same advantageous effects as those obtained in the first embodiment.

Embodiment 3

Figure 10B:
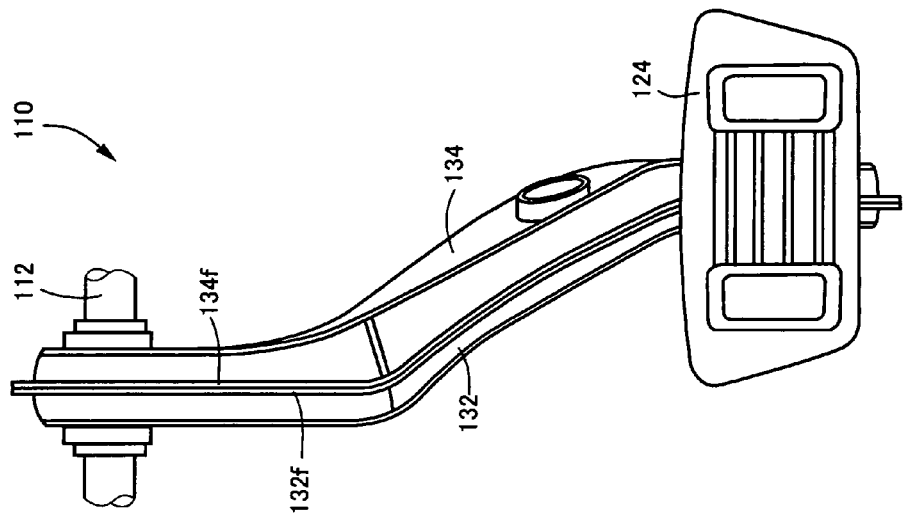
FIGS. 10A and 10B are diagrams each showing a brake pedal device for a service brake of a vehicle, to which the invention is applied, FIG. 10A being a left side view, and FIG. 10B being a front view.
Figure 10A:
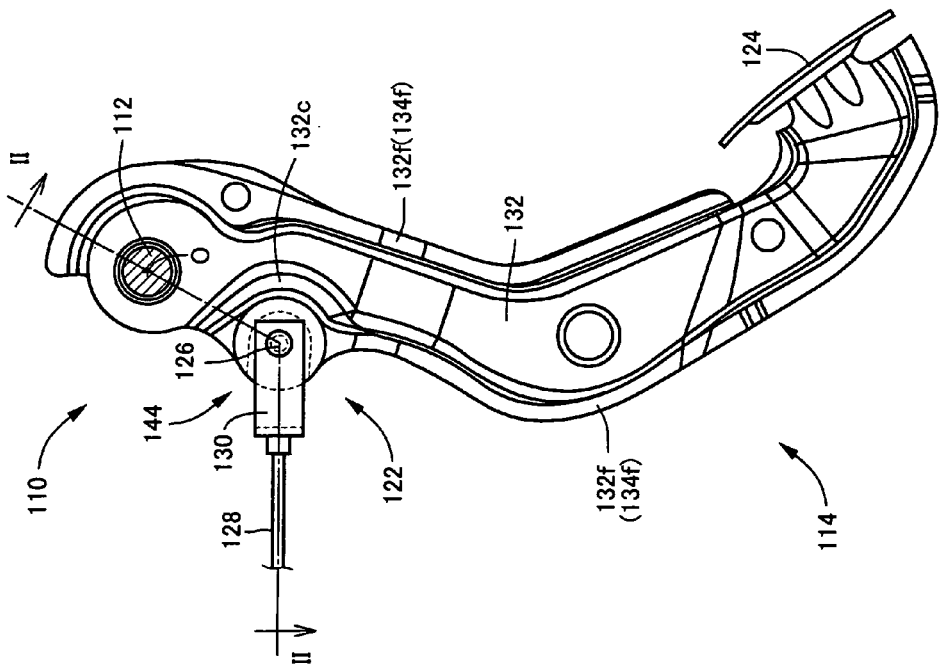

FIG. 10 are diagrams each showing a brake pedal device 110 for a service brake in yet another embodiment of the invention. FIG. 10A is a left side view, and FIG. 10B is a front view. In the brake pedal device 110, an operating pedal 114 is disposed to be pivotable around a shaft axis O of a support shaft 112 that is substantially horizontal to a pedal support (not shown) that is integrally fixed to a vehicle. When a driver depresses a pedal sheet 124 provided at a lower end of the operating pedal 114, the operating pedal 114 is pivoted around the support shaft 112 in a clockwise direction in FIG. 10A. A push rod 128 of a brake master cylinder is connected to the operating pedal 114 through a crevice 130 so that the push rod 128 is relatively pivotable around a shaft axis of a connecting pin 126 that is substantially parallel to the support shaft 112. When the operating pedal 114 is pivoted, the push rod 128 is mechanically pressed toward a left side in the figure. Thus, brake hydraulic pressure is generated in accordance with depressing force of the operating pedal 114, and reaction force thereof is applied to the push rod 128. The push rod 128 is urged to protrude from the brake master cylinder. When the pedal sheet 124, which has been depressed, is released, the operating pedal 114 is returned, that is, pivoted in the counterclockwise direction around the shaft axis O of the support shaft 112 due to the urging force, and thus, the operating pedal 14 is maintained at an original position shown in FIG. 10. In the embodiment, a connecting portion at which the operating pedal 114 is connected to the push rod 128 is a pivotal connecting portion 122 to which the invention is applied. The push rod 128 corresponds to the reaction force member. The shaft axis O of the support shaft 112 corresponds to the support shaft axis.

Figure 11:
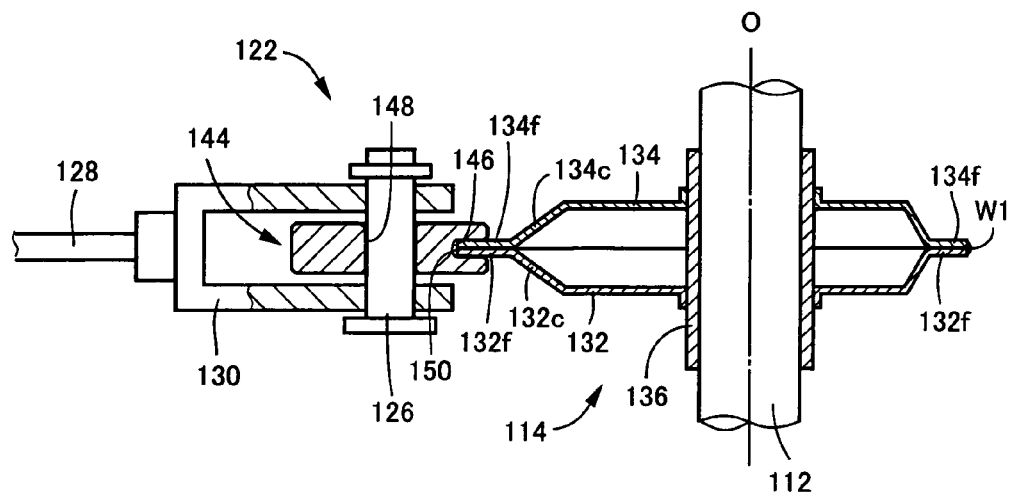
FIG. 11 is an enlarged view of a section taken along a line II-II- in FIG. 10A.

As evident from FIG. 11 that is an enlarged view of a section taken along a line II-II in FIG. 10A, the operating pedal 114 is constituted by a pair of half bodies 132 and 134. Each of the half bodies 132 and 134 has a shape obtained by dividing the operating pedal 114 in the vehicle width direction, that is, a top-bottom direction in FIG. 11. The operating pedal 114 has a space with, for example, a thickness that is approximately 6 to 15 times the thickness of each of the half bodies 132 and 134. That is, the operating pedal 14 has a hollow structure. Each of the half bodies 132 and 134 is formed by pressing and bending a relatively thin steel plate, and has a hat-shaped section. Flanges 132f and 134f in the form of plates are provided at outer peripheral portions of the half bodies 132 and 134, and are parallel to each other. Outer end edges of the flanges 132f and 134f, that is, the end edges extending in the front-rear direction and the top-bottom direction of the vehicle are integrally welded to each other by arc welding such as TIG welding, while open sides of the hat-shaped sections of the half bodies 132 and 134 face each other, and the flanges 132f and 134f are overlapped with each other so that the flanges 132f and 134f are in close contact with each other. First welding portions W1 in FIG. 11 and FIG. 15 indicate welding portions at which the flanges 132f and 134f are welded to each other. Through-holes are formed in portions of the paired half bodies 132 and 134, which are supported by the support shaft 112. A cylindrical boss 136, which extends through the half bodies 132 and 134, is integrally fixed to the half bodies 132 and 134 by welding or the like.

Figure 12:
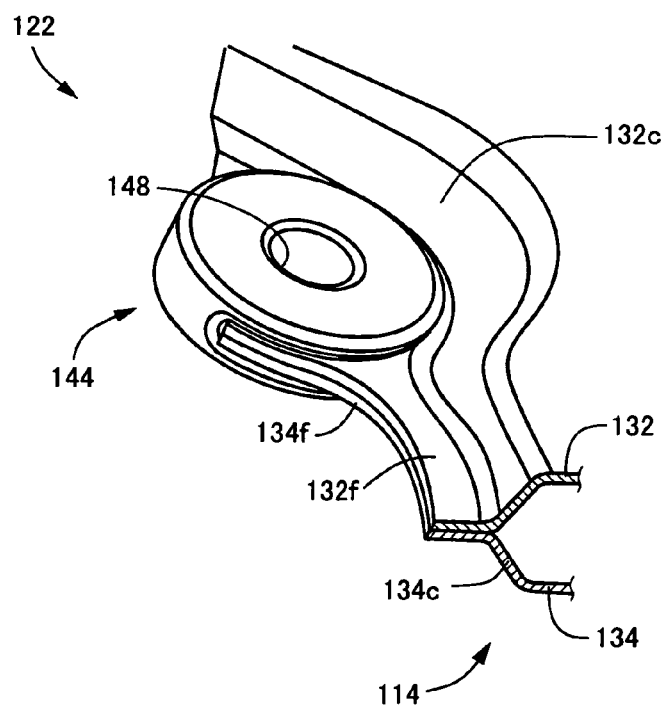
FIG. 12 is a perspective view showing an enlarged portion near a pivotal connecting portion at a side of an operating pedal, in the brake pedal device in FIG. 10.
Figure 13:
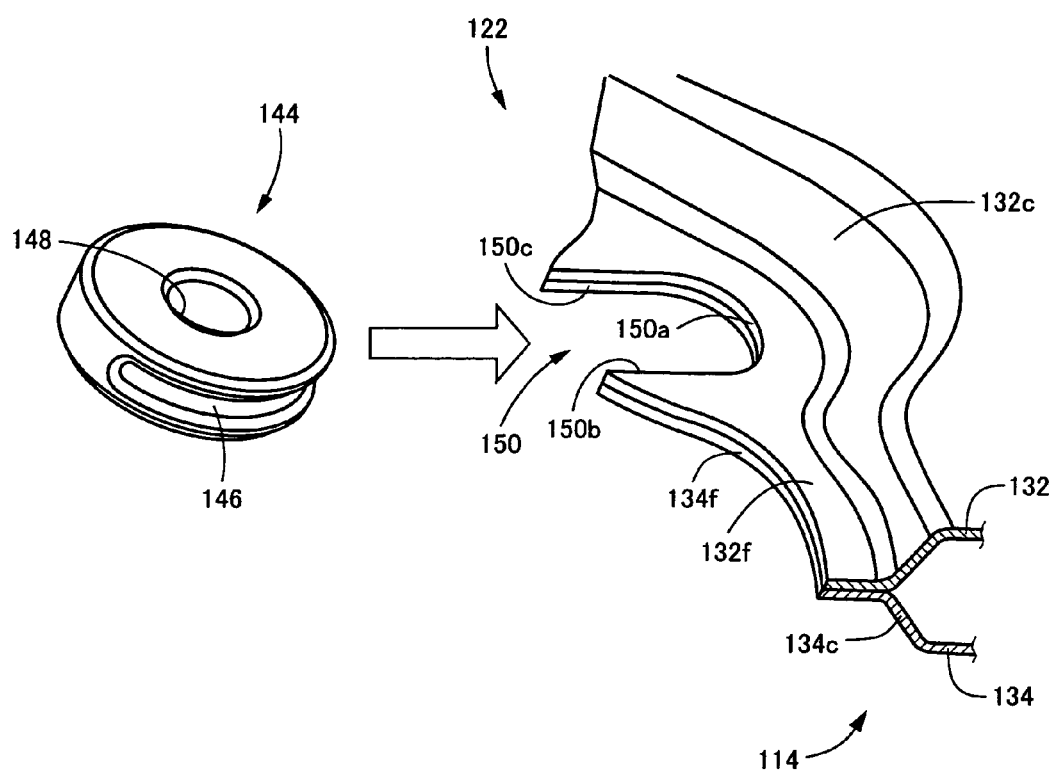
FIG. 13 is a perspective view showing a state before a reinforcement member is fitted to the operating pedal in FIG. 12.

Portions of the paired flanges 132f and 134f, which are connected to the push rod 128 through the pivotal connecting portion 122, that is, vehicle front-side portions of the flanges 132f and 134f, which are located at positions slightly lower than the support shaft 112, and to which a pressing load is applied due to the reaction force of the push rod 128, are in the form of flat plates substantially perpendicular to the shaft axis O of the support shaft 112. A reinforcement member 144 is integrally fixed to the vehicle front-side portions of the flanges 132f and 134f. The push rod 128 is connected to the reinforcement member 144 through the connecting pin 126. FIG. 12 is a perspective view showing the pivotal connecting portion 122 at the side of the operating pedal 114. FIG. 13 is a perspective view showing a state before the reinforcement member 144 is disposed in the operating pedal 114. As evident from FIG. 13, a cutout 150, which opens toward the front side of the vehicle, is formed in the flanges 132f and 134f of the operating pedal 114. The cutout 150 includes a terminal portion 150a with a semi-arc shape, and paired straight portions 150b and 150c that are continuous with both ends of the terminal portion 150a, and substantially parallel to each other. The cutout 150 is formed in a U-shape as a whole. The cutout 150 is symmetrical with respect to a center line of the U-shape.

The reinforcement member 144 is a component with a flat disc shape, which is made of a steel plate with a thickness larger than a total thickness of the overlapped half bodies 132 and 134, that is, a total thickness of the overlapped flanges 132f and 134f. A pin insertion hole 148, through which the connecting pin 126 is inserted, is formed at a center portion of the reinforcement member 144. A recessed groove 146 corresponding to the cutout 150 is formed on an outer peripheral surface of the reinforcement member 144. The recessed groove 146 continuously extends in a circumferential direction. The recessed groove 146 has a width large enough to allow the flanges 132f and 134f to be fitted therein. The reinforcement member 144 is fitted to the operating pedal 114 while the reinforcement member 144 is oriented so that the pin insertion hole 148 extends in substantially parallel with the shaft axis O. The connecting pin 126 is inserted through the pin insertion hole 148, and connected to the crevice 130. The connecting pin 126 is rotatable relative to both of the reinforcement member 144 and the crevice 130. The connecting pin 126 is rotated relative to one of the reinforcement member 144 and the crevice 130, which has lower friction than the other.

Figure 14A:
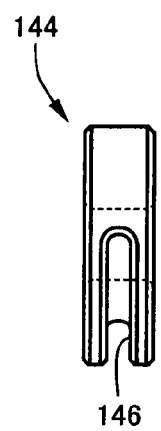
FIGS. 14A to 14D are diagrams each showing the reinforcement member, FIG. 14A being a left side view, FIG. 14B being a front view, FIG. 14C being a right side view, and FIG. 14D being a view of a section taken along a line VD-VD in FIG. 14C.
Figure 14B:
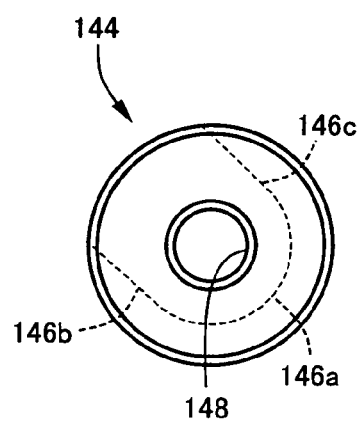
Figure 14C:
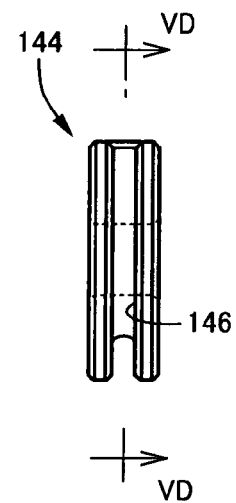
Figure 14D:
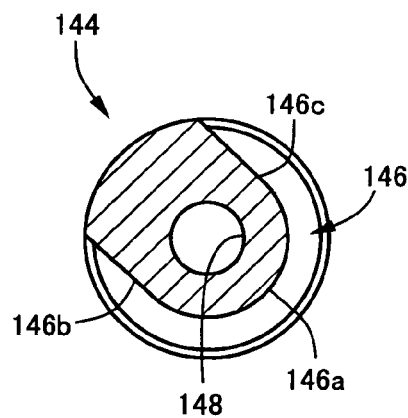

FIGS. 14A to 14D are diagrams each showing only the reinforcement member 144. The reinforcement member 144 has the shape of a substantially perfect circular disc with a radius larger than that of the terminal end portion 150a of the cutout 150. The recessed groove 146 formed on the outer peripheral surface of the disc shape includes a curve portion 146a with a semi-arc shape, which has the substantially same radius as that of the terminal end portion 150a, and is concentric with the disc shape; and paired straight portions 146b and 146c that are continuous with the both ends of the curve portion 146a, and substantially parallel to each other. Thus, the recessed groove 146 is formed in a U-shape as a whole. The reinforcement member 144 is symmetrical with respect to a center line of the U-shape of the recessed groove 146 of the reinforcement member 144. The reinforcement member 144 is configured using, for example, mild steel. The reinforcement member 144 is machined to have a predetermined shape shown in FIGS. 14A to 14D by a cutting operation, a cold forging operation, and the like. FIG. 14A is a left side view of FIG. 14B, FIG. 14B is a front view, FIG. 14C is a right side view of FIG. 14B, and FIG. 14D shows a section taken along a line VD-VD in FIG. 14C.

As shown in FIG. 13, the reinforcement member 144 is inserted in the cutout 150 from the open side of the cutout 150. The reinforcement member 144 is positioned with respect to the operating pedal 114 by fitting an inner peripheral edge portion of the cutout 150 in the recessed groove 146. In this case, the width of the cutout 150, that is, a distance between the straight portions 150b and 150c is set to be large so that the straight portions 146b and 146c of the recessed groove 146 can be moved with respect to the straight portions 150b and 150c by a predetermined amount. Thus, it is possible to adjust the position of the pin insertion hole 148 with respect to the operating pedal 114, that is, the position of the reinforcement member 144 with respect to the operating pedal 114. The curve portion 146a of the recessed groove 146 comes into contact with the terminal portion 150a of the cutout 150. A load is transmitted between the curve portion 146a of the recessed groove 146 and the terminal portion 150a of the cutout 150. Even when the reinforcement member 144 is fixed to the operating pedal 114 in a manner such that there is a slight gap between the curve portion 146a of the recessed groove 146 and the terminal portion 150a of the cutout 150, the curve portion 146a and the terminal portion 150a come into contact with each other due to elastic deformation of each portion caused by the reaction force, for example, when the brake is operated. Each of the reinforcement member 144 and the cutout 150 is symmetrical with respect to the center line of the U-shape. The reinforcement member 144 is inserted in the cutout 150 along a direction of the center line of the reinforcement member 144. Therefore, the reinforcement member 144 is symmetrical with respect to the direction in which the reinforcement member 144 is inserted. Accordingly, it is possible to insert the reinforcement member 144 in the cutout 150 in a manner such that the reinforcement member 144 is rotated by 180° around the center line thereof, that is, the reinforcement member 144 is reversed.

Figure 15A:
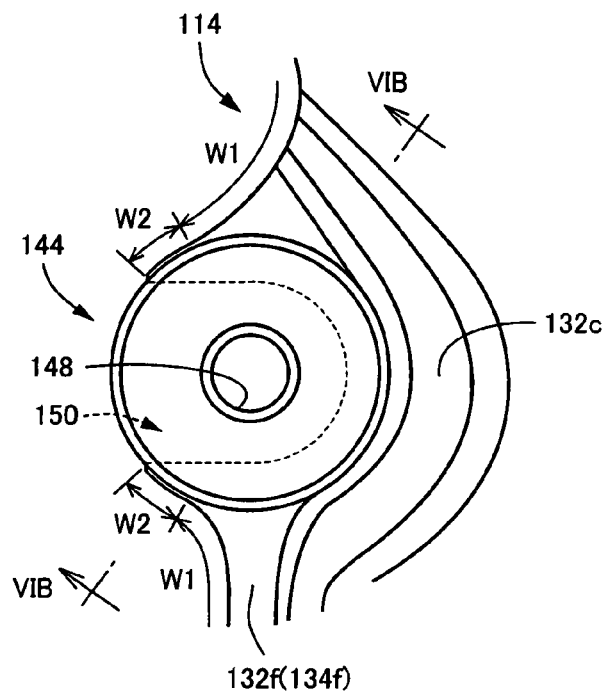
FIGS. 15A and 15B are diagrams each showing a portion near the pivotal connecting portion at the side of the operating pedal, FIG. 15A being a side view corresponding to FIG. 10A, and FIG. 15B being an enlarged view of a section taken along a line VIB-VIB in FIG. 15A.
Figure 15B:
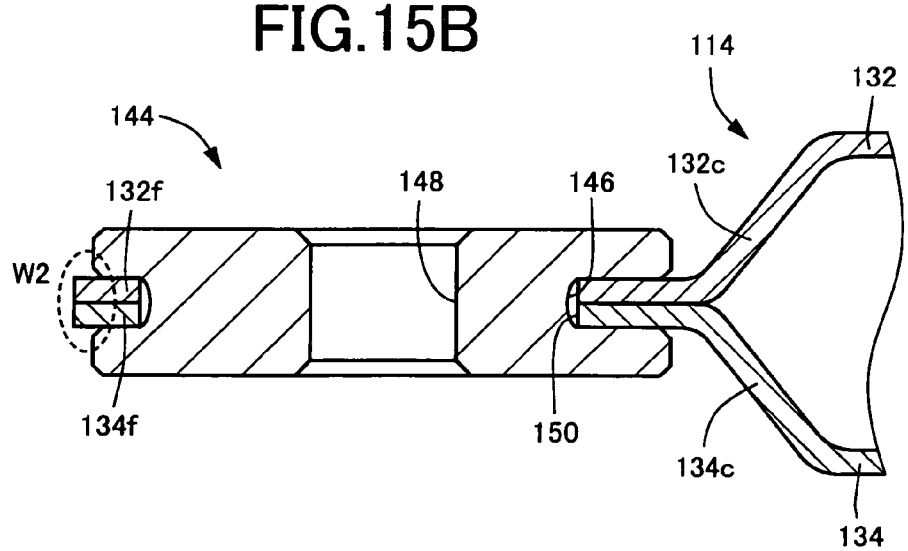

In the embodiment, while the paired half bodies 132 and 134 are maintained in a posture in which the paired half bodies 132 and 134 face each other so that the flanges 132f and 134f are in close contact with each other, and overlapped with each other, the reinforcement member 144 is inserted in the cutout 150 in the above-described manner and the inner peripheral edge portion of the cutout 150 is fitted in the recessed groove 146, before the half bodies 132 and 134 are welded to each other. Thus, in addition to positioning the reinforcement member 144 with respect to the operating pedal 114, the relative positions of the paired half bodies 132 and 134 constituting the operating pedal 114 are also determined. In this state, the outer end edges of the flanges 132f and 134f are integrally welded to each other, that is, the flanges 132f and 134f are integrally welded to each other at the first welding portions W1 by arc welding. As shown in FIG. 15, the outer end edges of the flanges 132f and 134f substantially coincide with the outer peripheral portion of the reinforcement member 144, in a predetermined range near the open side of the cutout 150, in the flanges 132f and 134f. In a precise sense, the flanges 132f and 134f slightly protrude from the recessed groove 146. Thus, the flanges 132f and 134f, and the outer peripheral portion of the reinforcement member 144 are simultaneously and integrally welded together by arc welding. A welding portion W2 in FIG. 15B is a welding portion including a portion of the reinforcement member 144. In a series of welding operations, it is possible to continuously perform welding at the first welding portions W1 and welding at the second welding portions W2 without interruption, by changing a welding condition, such as welding current, while moving a welding torch or the like for the arc welding along the outer peripheral edges of the flanges 132f and 134f. FIG. 15A is a side view corresponding to FIG. 1A. FIG. 15B is a sectional view showing an enlarged section taken along a line VIB-VIB in FIG. 15A.

In the paired half bodies 132 and 134 constituting the operating pedal 114, mortar-shaped inclined portions 132c and 134c are provided in areas around the cutout 150 to which the reinforcement member 144 is fixed. The inclined portions 132c and 134c obliquely extend so that a distance between the inclined portions 132c and 134c increases in a direction away from the cutout 150. The reinforcement member 144 is pressed toward the terminal end portion 150a of the cutout 150 due to the reaction force applied from the connecting pin 126 to the reinforcement member 144. The reaction force applied from the reinforcement member 144 to the paired half bodies 132 and 134 is efficiently dispersed due to the mortar-shaped inclined portions 132c and 134c. The inclined portions 132c and 134c in the embodiment are formed to be smooth so that the inclined portions 132c and 134c form a portion of a taper shape.

Figure 16:
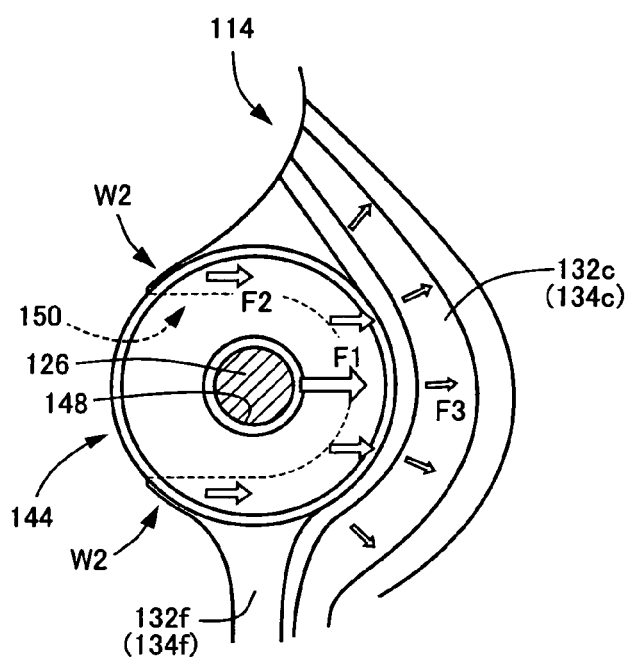
FIG. 16 is a diagram that explains a transmission path along which reaction force applied to the reinforcement member is transmitted, and that is a side view corresponding to FIG. 10A.

FIG. 16 is a diagram explaining a transmission path along which the reaction force applied from the push rod 128 to the reinforcement member 144 through the connecting pin 126 is transmitted, in the brake pedal device 110 in the embodiment. FIG. 16 is a side view corresponding to FIG. 1A. The reaction force F1 indicated by a large-sized arrow is reaction force transmitted from the connecting pin 126 to the reinforcement member 144. The reaction force is transmitted from the reinforcement member 144 to the operating pedal 114 through the second welding portions W2 and the cutout 150, particularly the terminal portion 150a, and thus the reaction force is dispersed, as shown by reaction force F2 indicated by middle-sized arrows. As a result, stress concentration at the flanges 132f and 134f is reduced, a surface pressure is decreased, and the rigidity of the paired half bodies 132 and 134 is increased. Therefore, the buckling due to the reaction force is suppressed while the plate thickness of the half bodies 132 and 134 is maintained to be small. In the paired half bodies 132 and 134, the mortar-shaped inclined portions 132c and 134c are provided in the areas around the portion to which the reinforcement member 144 is fixed. The inclined portions 132c and 134c obliquely extend so that the distance between the half bodies 132c and 134c increases in the direction away from the reinforcement member 144. Therefore, the reaction force F2, which is transmitted from the reinforcement member 144 to the flanges 132*f* and 134*f* of the paired half bodies 132 and 134, is further efficiently dispersed due to the inclined portions 132*c* and 134*c*, as shown by reaction force F3 indicated by small-sized arrows. As a result, the surface pressure applied to the paired half bodies 132 and 134 is further decreased.

Thus, in the brake pedal device 110 in the embodiment, in the flanges 132*f* and 134*f* provided at the outer peripheral portion of the operating pedal 114 with the hollow structure, the portions connected to the push rod 128 through the pivotal connecting portion 122 are in the form of flat plates substantially perpendicular to the shaft axis O of the support shaft 112, and the cutout 150 is formed at the portions. The reinforcement member 144, which has the pin insertion hole 148 through which the connecting pin 126 is inserted, is inserted in the cutout 150, and integrally fixed to the cutout 150. Therefore, the reaction force F2 transmitted from the connecting pin 126 to the flanges 132*f* and 134*f* through the reinforcement member 144 is dispersed. Thus, the buckling and deformation due to the stress concentration is prevented, and the rigidity of the flanges 132*f* and 134*f* in the form of plates is improved.

Because the connecting pin 126 is inserted through the pin insertion hole 148 formed to extend through the reinforcement member 144, the efficiency of the operation is improved. In addition, because the reaction force F1 is received by the entire inner peripheral surface defining the pin insertion hole 148, the wear of the pin insertion hole 148 is suppressed even when the connecting pin 126 is relatively rotated.

In the embodiment, the operating pedal 114 has the structure in which the flanges 132*f* and 134*f* provided at the outer peripheral portions of the paired half bodies 132 and 134 are integrally joined in a manner such that the flanges 132*f* and 134*f* are overlapped with each other. The recessed groove 146 corresponding to the cutout 150 is formed at the outer peripheral portion of the reinforcement member 144, and the flanges 132*f* and 134*f* are fitted in the recessed groove 146. The reinforcement member 144 is positioned with respect to the operating pedal 114 by fitting the inner peripheral edge portion of the cutout 150 in the recessed groove 146. Therefore, in the case where the reinforcement member 144 is inserted in the cutout 150 before the paired half bodies 132 and 134 are integrally joined, the paired half bodies 132 and 134 are positioned by the reinforcement member 144. Thus, as compared to the case where paired burring holes are formed, or a collar or the like is disposed, the management of high dimensional accuracy is not required, for example, center alignment is not required. Accordingly, the operation of assembling the operating pedal 114 including the reinforcement member 144 is facilitated. This reduces the manufacturing cost. Particularly, because the reinforcement member 144 is inserted in the cutout 150 so that the inner peripheral edge portion of the cutout 150 is fitted in the recessed groove 146, it is possible to fit the reinforcement member 144 to the operating pedal 114 with a single action. Thus, the assembly operation is further facilitated, and the productivity is improved.

In the embodiment, while the flanges 132*f* and 134*f* of the paired half bodies 132 and 134 are overlapped with each other, the outer end edges of the flanges 132*f* and 134*f* are fusion joined by the arc welding. The outer end edges of the flanges 132*f* and 134*f* substantially coincide with the outer peripheral portion of the reinforcement member 144 in the predetermined range near the open side of the cutout 150 at which the flanges 132*f* and 134*f* are fitted in the recessed groove 146 of the reinforcement member 144. That is, the outer end edges of the flanges 132*f* and 134*f* substantially coincide with the outer peripheral portion of the reinforcement member 144 at the second welding portions W2. Therefore, the outer peripheral portion of the reinforcement member 144 is integrally welded to the flanges 132*f* and 134*f* simultaneously with the welding of the flanges 132*f* and 134*f* to each other. Thus, in a series of welding operations, it is possible to continuously perform, without interruption, the welding operation at the first welding portions W1 at which the outer end edges of the flanges 132*f* and 134*f* are fusion joined, and the welding operation at the second welding portions W2 at which the reinforcement member 144 is joined to the flanges 132*f* and 134*f* simultaneously with the fusion joining of the flanges 132*f* and 134*f*. Thus, it is possible to further improve the productivity.

In the embodiment, each of the cutout 150 and the reinforcement member 144 is symmetrical with respect to the direction in which the reinforcement member 144 is inserted in the cutout 150. That is, the cutout 150 is symmetrical with respect to the center line of the U-shape thereof, and the reinforcement member 144 is symmetrical with respect to the center line of the U-shape thereof. Therefore, it is possible to insert the reinforcement member 144 in a manner such that the reinforcement member 144 is rotated 180° around the symmetry center line. Accordingly, the efficiency of the operation of fitting the reinforcement member 144 to the operating pedal 114 is improved, and the productivity is further increased.

In the paired half bodies 132 and 134, the mortar-shaped inclined portions 132*c* and 134*c* are provided in the areas around the portion to which the reinforcement member 144 is fixed. The inclined portions 132*c* and 134*c* obliquely extend so that the distance between the inclined portions 132*c* and 134*c* increases in the direction away from the reinforcement member 144. Therefore, the reaction force F2, which is transmitted from the reinforcement member 144 to the flanges 132*f* and 134*f* of the paired half bodies 132 and 134, is further efficiently dispersed due to the mortar-shaped inclined portions 132*c* and 134*c*, as shown by the reaction force F3 indicated by the small-sized arrows. As a result, the surface pressure applied to the paired half bodies 132 and 134 is further decreased, and the rigidity is improved. Thus, the buckling due to the reaction force is more effectively suppressed, while the plate thickness of the half bodies 132 and 134 is maintained to be small.

Embodiment 4

Figure 17:
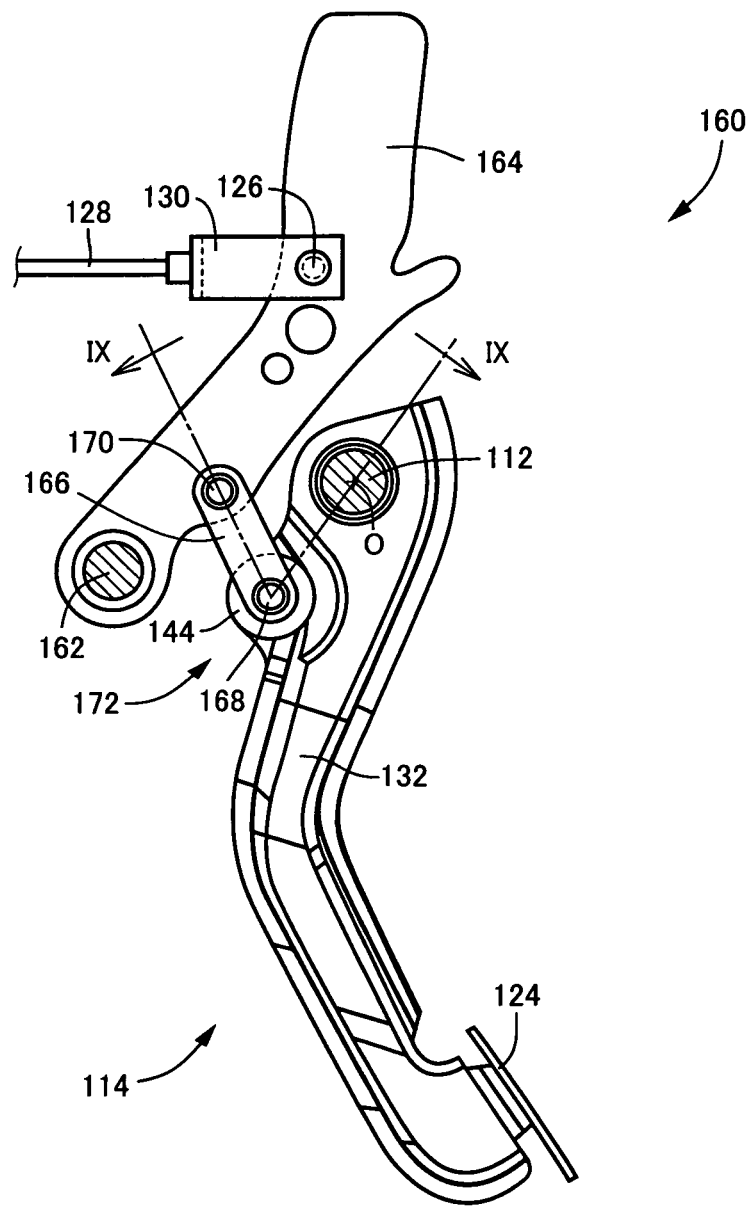
FIG. 17 is a diagram that shows another embodiment of the invention, and that is a side view corresponding to FIG. 10A.

In a brake pedal device 160 in FIG. 17, an intermediate lever 164 is disposed to be pivotable around a shaft axis of a second support shaft 162 that is substantially parallel to the shaft axis O of the first support shaft 12. Connecting links 166 are disposed to extend from the operating pedal 114 to the intermediate lever 164. When the pedal sheet 124 of the operating pedal 114 is depressed, the operating pedal 114 is pivoted around the support shaft 112 in the clockwise direction in FIG. 17. In addition, the intermediate lever 164 is mechanically pivoted around the second support shaft 162 in the counterclockwise direction through the connecting links 166 connected to the operating pedal 114. The push rod 128 is connected to an upper end portion of the intermediate lever 164 through the connecting pin 126 that is substantially parallel to the second support shaft 162. When the push rod 128 is mechanically pressed toward a left side in the figure due to the pivoting of the intermediate lever 164, a brake hydraulic pressure is generated in accordance with the depressing force of the operating pedal 114, and reaction force thereof is applied to the push rod 128.

Figure 18:
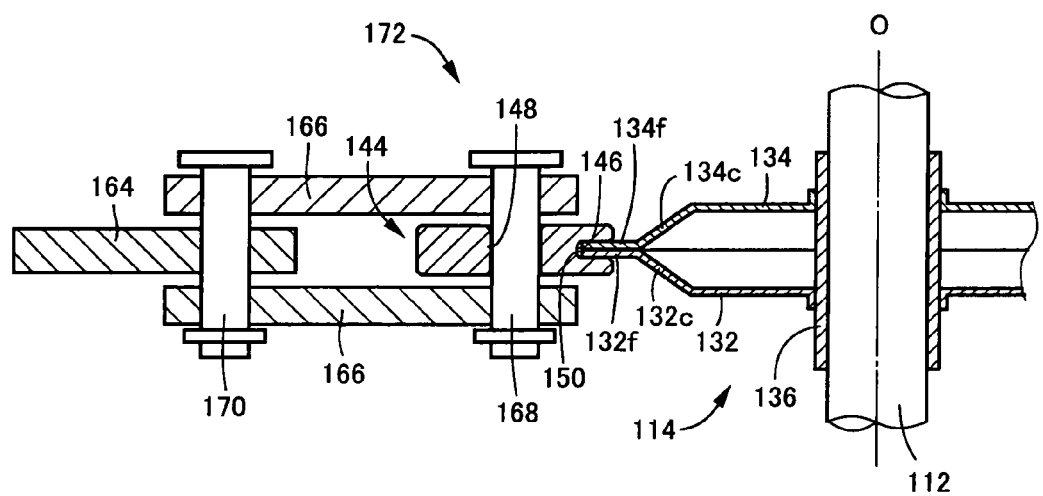
FIG. 18 is an enlarged view of a section taken along a line IX-IX in FIG. 17.

FIG. 18 is a diagram showing an enlarged section taken along a line IX-IX in FIG. 17. The paired connecting links 166 are disposed on both sides of the operating pedal 114 and the intermediate lever 164. The paired connecting links 166 are relatively pivotably connected to the operating pedal 114 through a first connecting pin 168 that is substantially parallel to the shaft axis O of the support shaft 112. The paired connecting links 166 are relatively pivotably connected to the intermediate lever 164 through a second connecting pin 170 that is substantially parallel to the first connecting pin 168. The connecting pins 168 and 170 are disposed to extend through the operating pedal 114 and the intermediate lever 164, respectively. The paired connecting links 166 are connected to end portions of the first connecting pin 168, which protrude toward both sides of the operating pedal 114, and connected to end portions of the second connecting pin 170, which protrude toward both sides of the intermediate lever 164. The connecting pins 168 and 170 are prevented from falling off the operating pedal 114 and the intermediate lever 164, using snap rings or the likes.

In the embodiment, a portion at which the operating pedal 114 and the connecting links 166 are relatively pivotably connected to each other is a pivotal connecting portion 172. As in the above-described embodiments, the connecting links 166 are connected to the reinforcement member 144 disposed in the operating pedal 114 so that the connecting links 166 are relatively pivotable around the shaft axis of the first connecting pin 168. The first connecting pin 168 corresponds to a connecting pin of the pivotal connecting portion 172. The first connecting pin 168 is rotatable relative to both of the reinforcement member 144 and the connecting link 166. The first connecting pin 168 is relatively rotated one of the reinforcement member 144 and the connecting link 166, which has lower friction than the other. In the embodiment as well, it is possible to obtain the same advantageous effects as those obtained in the above-described embodiments, by integrally disposing the reinforcement member 144 in the operating pedal 114.

Although the case where the operating pedal 114 has the hollow structure has been described in the embodiment, it is possible to further reduce the weight of the entire device while obtaining the same advantageous effects as those obtained in the embodiment, by employing the intermediate lever 164 that has the same hollow structure as the hollow structure of the operating pedal 114, and disposing the reinforcement member 144 in the pivotal connecting portion at the position corresponding to the first connecting pin 168 and the second connecting pin 170.

It is to be understood that the embodiments of the invention have been described for illustrative purpose only, and that the present invention may be embodied with various changes and modifications which may occur to those skilled in the art.

The invention claimed is:

1. A vehicle operating pedal device including an operating pedal that is disposed on a pedal support fixed to a vehicle so that the operating pedal is pivoted around a support shaft axis, and that is depressed by a driver; a reaction force member to which operating force of the operating pedal is transmitted, and to which reaction force corresponding to the operating force is applied; a pivotal connecting portion disposed between the operating pedal and the reaction force member, or between the operating pedal and an intermediate member that transmits the operating force to the reaction force member, the pivotal connecting portion connecting the operating pedal and the reaction force member so that the operating pedal and the reaction force member are pivoted separately around a connecting pin that is parallel to the support shaft axis, or connecting the operating pedal and the intermediate member so that the operating pedal and the intermediate member are pivoted around the connecting pin separately, and the pivotal connecting portion transmitting the operating force through the connecting pin, the operating pedal having a hollow structure;

paired through-holes being formed in paired side walls which form flat plates and are located on both sides in a vehicle width direction, parallel to each other and substantially perpendicular to the support shaft axis, at positions on a straight line that is substantially parallel to the support shaft axis, in the pivotal connecting portion for the operating pedal; and the vehicle operating pedal device including a reinforcement member which has a form of a flat plate and is disposed between the paired side walls, a pin insertion hole is formed in the reinforcement member at a position corresponding to the paired through-holes, the connecting pin is inserted through the pin insertion hole, and the reinforcement member is integrally fixed to the paired side walls at a portion on an outer peripheral side of the pin insertion hole.

2. The vehicle operating pedal device according to claim 1, wherein the operating pedal is formed by integrally joining paired half bodies;

flat portions of the paired half bodies, which are substantially perpendicular to the support shaft axis, and parallel to each other, are the paired side walls;

the reinforcement member integrally includes a body portion in a form of the flat plate, which is located in a manner such that the body portion is sandwiched between inner portions of the paired side walls, and paired fitting protruding portions that are symmetrically provided to protrude from both end surfaces of the body portion, and that are fitted in the paired through-holes;

the pin insertion hole is formed to extend through the paired fitting protruding portions; and the reinforcement member is positioned with respect to the operating pedal by fitting the paired fitting protruding portions in the respective paired through-holes.

3. The vehicle operating pedal device according to claim 1, wherein a portion of an outer peripheral edge of the reinforcement member substantially coincides with side end edges of the paired side walls, constitutes a portion of an outer peripheral shape of the operating pedal, and is integrally welded to the side end edges.

4. The vehicle operating pedal device according to claim 3, wherein mortar-shaped inclined portions are provided at portions on a side opposite to portions to which the reinforcement member is fixed, in areas around a center line of the pin insertion hole of the reinforcement member, in the paired side walls; and the inclined portions obliquely extend from the reinforcement member so that a distance between the inclined portions increases in a direction away from the pin insertion hole.

5. The vehicle operating pedal device according to claim 1, wherein the reinforcement member is integrally fixed to the paired side walls at a portion on a side opposite to a side toward which the reaction force is applied from the connecting pin, in an area around a center line of the pin insertion hole.

6. The vehicle operating pedal device according to claim 1, wherein
the reinforcement member is integrally fixed to a boss that is integrally provided in the operating pedal to be concentric with the support shaft axis.

7. The vehicle operating pedal device according to claim 1, wherein
a connecting link, which is the intermediate member, is pivotally connected to the operating pedal separately through the pivotal connecting portion; and
the connecting link is connected to the reaction force member through an intermediate lever that is disposed to be pivoted around a pivotal shaft axis that is parallel to the support shaft axis.

8. The vehicle operating pedal device according to claim 1, wherein
the reaction force member is directly connected to the operating pedal through the pivotal connecting portion.

\* \* \* \* \*